US005559550A

United States Patent [19]

Mankovitz

[11] Patent Number: 5,559,550
[45] Date of Patent: Sep. 24, 1996

[54] APPARATUS AND METHODS FOR SYNCHRONIZING A CLOCK TO A NETWORK CLOCK

[75] Inventor: Roy J. Mankovitz, Encino, Calif.

[73] Assignee: Gemstar Development Corporation, Pasadena, Calif.

[21] Appl. No.: 421,385

[22] Filed: Apr. 13, 1995

Related U.S. Application Data

[63] Continuation-in-part of Ser. No. 404,046, Mar. 14, 1995, which is a continuation-in-part of Ser. No. 396,559, Mar. 1, 1995.

[51] Int. Cl.[6] ................................................ H04N 5/76
[52] U.S. Cl. ........................ 348/6; 348/906; 368/46; 358/335; 455/2
[58] Field of Search ............................ 348/731, 732, 348/734, 906, 5, 6, 7, 12, 13; 455/151.2, 181.1, 186.1, 2; 358/335; 360/33.1; 368/10, 46, 47; H04N 5/76

[56] References Cited

U.S. PATENT DOCUMENTS

| | | | |
|---|---|---|---|
| 2,188,145 | 1/1940 | Frantz | 58/24 |
| 2,671,131 | 3/1954 | Johnson | 178/6 |
| 2,700,065 | 1/1955 | Evans | 178/5.8 |
| 2,851,550 | 9/1958 | Searcy | 200/51.02 |
| 2,856,474 | 10/1958 | Norris | 200/44 |
| 3,881,310 | 5/1975 | Gerum et al. | 58/35 |
| 4,012,583 | 3/1977 | Kramer | 358/84 |
| 4,023,344 | 5/1977 | Mukaiyama | 58/35 |
| 4,087,958 | 5/1978 | Ebihara et al. | 58/25 |
| 4,247,743 | 1/1981 | Hinton et al. | 200/44 |
| 4,321,593 | 3/1982 | Ho et al. | 340/541 |
| 4,348,696 | 9/1982 | Beier | 358/188 |
| 4,390,901 | 6/1983 | Keiser | 358/147 |
| 4,475,153 | 10/1984 | Kihara et al. | 364/145 |
| 4,501,502 | 2/1985 | Van Orsdel | 368/47 |
| 4,510,623 | 4/1985 | Bonneau et al. | 455/181 |

(List continued on next page.)

FOREIGN PATENT DOCUMENTS

| | | | |
|---|---|---|---|
| 328440 | 10/1989 | European Pat. Off. | H04N 1/00 |
| 424725 | 2/1991 | European Pat. Off. | H04N 5/82 |
| 4129571 | 3/1993 | Germany . | |
| 58-139532 | 8/1983 | Japan . | |
| 117578 | 10/1989 | Japan | H04N 5/78 |
| 200791 | 11/1989 | Japan | H04N 7/80 |
| 383243 | 4/1991 | Japan . | |
| 757334 | 3/1995 | Japan | 15/2 |

OTHER PUBLICATIONS

Lamar West, Himanshu Parikh, Neil Robertson, Allen Childers, Mark Doremus, Off Premises Technology Comparisons, *Scientific–Atlanta* 1989 NCTA Technical Papers, pp. 39–56.

James A. Chiddix, David M. Pangrac, Off–Premises Broadband Addressability: A CATV Industry Challenge, *American Television and Communications Corporation*, Stamford Connecticut, 1989 NCTA Technical Papers, pp. 57–64.

Gary Libman, Times Staff Writer Chaining The Channels, A New Generation of Television Blocking Systems Allows More Options for Parents Seeking to Control Kids' Viewing, *Los Angeles Times* Aug. 9, 1993.

*Primary Examiner*—John K. Peng
*Assistant Examiner*—Glenton B. Burgess
*Attorney, Agent, or Firm*—Christie, Parker & Hale, LLP

[57] ABSTRACT

Apparatus and methods are provided for synchronizing a clock to a network clock. In one embodiment the apparatus includes a device for receiving a first compressed code representative of, and compressed in length from, the combination of a channel, a time-of-day, and a length of time for a first program on a first day and on a first channel currently displayed on a television, a decoder for decoding the first compressed code into a first channel, a first time-of-day, and a first length of time, a device for receiving an end of program indication for the program, and a device for loading the sum of the first time-of-day and the first length of time into the clock calendar in response to receiving the end of program indication.

35 Claims, 23 Drawing Sheets

U.S. PATENT DOCUMENTS

| | | | |
|---|---|---|---|
| 4,566,033 | 1/1986 | Reidenouer | 358/115 |
| 4,604,708 | 8/1986 | Lewis | 364/900 |
| 4,605,964 | 8/1986 | Chard | 358/147 |
| 4,620,229 | 10/1986 | Amano et al. | 358/194.1 |
| 4,623,887 | 11/1986 | Welles, II | 340/825.57 |
| 4,647,735 | 3/1987 | Sicher | 200/43.08 |
| 4,648,667 | 3/1987 | Baumgart | 339/37 |
| 4,718,107 | 1/1988 | Hayes | 455/4 |
| 4,718,112 | 1/1988 | Shinoda | 455/151 |
| 4,768,229 | 8/1988 | Benjamin et al. | 380/20 |
| 4,823,385 | 4/1989 | Hegendorfer | 380/10 |
| 4,825,200 | 4/1989 | Evans et al. | 341/23 |
| 4,841,132 | 6/1989 | Kajitani et al. | 235/472 |
| 4,866,542 | 9/1989 | Shimada et al. | 360/10.3 |
| 4,888,796 | 12/1989 | Olivo, Jr. | 379/101 |
| 4,899,370 | 2/1990 | Kameo et al. | 379/104 |
| 4,903,031 | 2/1990 | Yamada | 342/359 |
| 4,930,158 | 5/1990 | Vogel | 380/5 |
| 4,965,557 | 10/1990 | Schepers et al. | 340/711 |
| 5,001,554 | 3/1991 | Johnson et al. | 358/86 |
| 5,021,916 | 6/1991 | Hubbard | 361/171 |
| 5,033,085 | 7/1991 | Rew | 380/20 |
| 5,046,125 | 9/1991 | Takizawa | 455/26.1 |
| 5,051,837 | 9/1991 | McJunkin | 358/349 |
| 5,053,797 | 10/1991 | Samuels et al. | 354/322 |
| 5,056,070 | 10/1991 | Shibuya et al. | 368/10 |
| 5,056,139 | 10/1991 | Littlefield | 380/20 |
| 5,063,543 | 11/1991 | Shibuya et al. | 368/29 |
| 5,089,814 | 2/1992 | DeLuca et al. | 340/825.49 |
| 5,166,911 | 11/1992 | Misawa et al. | 368/10 |
| 5,226,090 | 7/1993 | Kimura | 381/110 |
| 5,228,077 | 7/1993 | Darbee | 379/102 |
| 5,251,191 | 10/1993 | Sturzl et al. | 368/47 |
| 5,255,313 | 10/1993 | Darbee | 379/102 |
| 5,258,964 | 11/1993 | Koma et al. | 368/47 |
| 5,265,070 | 11/1993 | Minowa | 368/47 |
| 5,303,063 | 4/1994 | Kim et al. | 358/335 |
| 5,307,173 | 4/1994 | Yuen et al. | 358/335 |
| 5,319,374 | 6/1994 | Desai et al. | 342/387 |
| 5,335,079 | 8/1994 | Yuen et al. | 358/335 |
| 5,414,756 | 5/1995 | Levine | 379/67 |

OTHER PUBLICATIONS

Daniel H. Smart, Innovative Aspects Of A Switched Star Cabled Television Distribution System, *British Cable Services Limited*, 1987 NCTA Technical Papers, pp. 26–35.

Richard G. Merrell, Mack S. Daily, An Auto–Dialer Approach To Pay–Per–View Purchasing, *Zenith Electronics Corporation*, Glenview, Illinois, 1989 NCTA Technical Papers, pp. 34–38.

Daniel F. Walsh Jr., Timing Considerations In RF Two Way Data Collection And Polling, *Jerrold–Applied Media Lab*, 1989 NCTA Technical Papers, pp. 47–56.

Gregory F. Vaeth, John Feras, Enertec, Inc., The Addressable Controller Of The Future, *General Instrument/Jerrold Communication*, 1990 NCTA Technical Papers, pp. 274–279.

FIG. 4

THURSDAY—204  FEBRUARY 9, 1989—202

208—
206—6PM [18] SPORTS RETROSPECTIVE; 60 MIN.[68713]
[24] NATURESCENE[5321]
A VISIT TO THE COLORADO NATIONAL MONUMENT NEAR GRAND JUNCTION, WHERE WILDFLOWERS, INSECTS AND BIRDS ARE OBSERVED.
[34] [52] NOTICIAS[62921][496649]—212
[40] DWIGHT THOMPSON--RELIGION;[68553]
[50] HUMANITIES THROUGH THE ARTS[493065]
[56] BEVERLY HILLBILLIES--COMEDY[496777]

FRIDAY—204  FEBRUARY 10, 1989—202

206—6:30 [CB] MOVIE--DRAMA; 70 MIN.(23627113)  ←200
[11] FAMILY TIES(CC)--COMEDY[15657]
MALLORY'S REUNION WITH HER COLLEGE BOY FRIEND (JOHN DUKAKIS) HAS HER WORRIED THAT SHE MAY NOT BE AS INTERESTING TO HIM AS SHE ONCE WAS.
208—[56] HOGAN'S HEROES--COMEDY[510857]
CARTERS MASQUERADE AS A TRAITOR MAY BE KAPUT: A LOVELY FRAULEIN IS TRYING TO POISON HIM.
[C14] [NIK] DOUBLE DARE--GAME(29225)—212
[C11] [TNN] VIDEO COUNTRY(29129)
[C7] [USA] CARTOON EXPRESS(23561)
206—7PM [5] CHARLES IN CHARGE(CC)--COMEDY[1065]
WHILE PLANNING A PIZZA-PARLOR PARTY, CHARLES ALIENATES THE POWELL CHILDREN BY DISMISSING THEIR SUGGESTIONS ABOUT ORGANIZING THE EVENT.

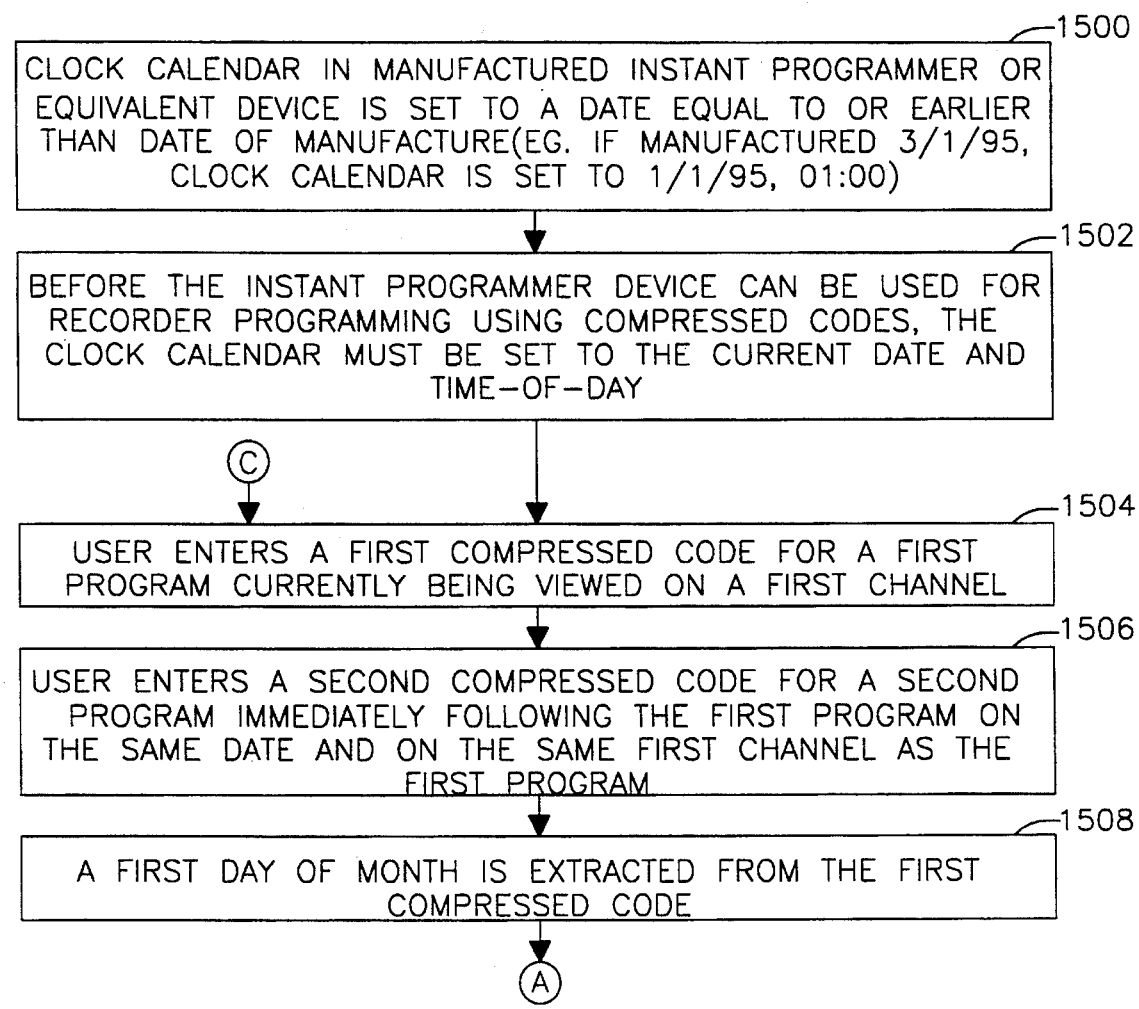

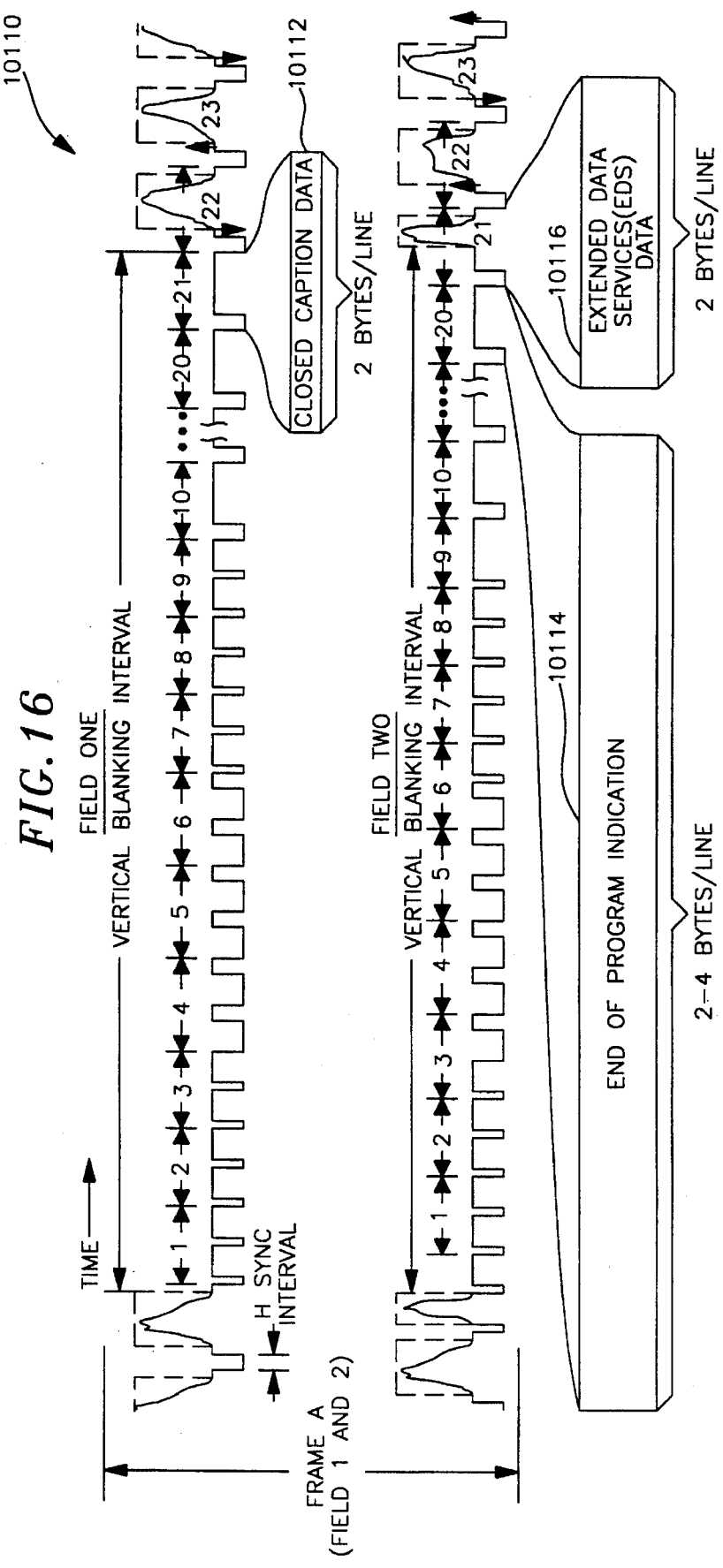

APPARATUS AND METHODS FOR SYNCHRONIZING A CLOCK TO A NETWORK CLOCK

BACKGROUND OF THE INVENTION

This is a continuation-in-part of pending U.S. patent application, Ser. No. 08/404,046, filed Mar. 14, 1995, which is a continuation-in-part of pending U.S. patent application, Ser. No. 08/396,559, filed Mar. 1, 1995. The subject matter of the above-referenced patent application is incorporated herein by this reference as though set forth in full.

FIELD OF THE INVENTION

This invention relates to televisions, video cassette recorders and remote controllers for controlling televisions and video cassette recorders and to clock setting for clocks in televisions, video cassette recorders and remote controllers.

DESCRIPTION OF THE RELATED ART

Cable channel systems and satellite television channel transmission systems are providing an increasing number of television channels. As the number of channels available to a viewer increases, the burden on the television user increases. For example, viewers previously were able to switch between less than 10 channels to determine the programs that are playing and to select a channel for viewing. In today's systems, this form of review is a difficult task.

U.S. Pat. No. 5,335,079, which issued Aug. 2, 1994, is incorporated herein by this reference as though set forth in full, and describes apparatus and methods for using compressed codes for recorder preprogramming. As described in the patent, one of the steps is mapping an assigned channel to a local channel number. In order to set up the apparatus for using compressed codes for recorder preprogramming, the user must enter data into a table that is used for converting or mapping assigned channel numbers to local channel numbers. For systems with up to two hundred channels, entering the data into the channel mapping table can be tedious.

When televisions, video cassette recorders, and remote controllers are manufactured, clocks in the appliances are set to an arbitrary date and time, such as Jan. 1, 1995 at 8 o'clock. A purchaser of a new appliance must set the clock in the device to the correct year, month, day of the month and time-of-day. This is particularly necessary for a clock that is used to determine when to record a program, when to allow program viewing or when to switch channels, for example. Also, before compressd codes can be decoded, the user must set a clock in the device used for decoding the compressed codes. In general, it is best to have the clock synchronized to the network clock.

SUMMARY OF THE INVENTION

An object of the present invention is to provide a user with a convenient method of setting a clock in a television, video cassette recorder, and/or remote controller, to the correct year, month, day of the month and time-of-day. Another object of the invention is to synchronize a clock to a network clock.

According to the invention, apparatus and methods are provided for synchronizing a clock to a network clock. In one embodiment the apparatus includes a device for receiving a first compressed code representative of, and compressed in length from, the combination of a channel, a time-of-day, and a length of time for a first program being displayed on a first channel on a television on a first day. A user looks up the first compressed code for the first program in a published guide and enters the compressed code. A decoder decodes the first compressed code into the first channel, the first time-of-day, and the first length of time. A device is provided for receiving an end of program indication for the program. The end of program indication is entered by a user, who presses a button or similar entry device when the first program ends. The sum of the first time-of-day and the first length of time is loaded into the clock calendar in response to receiving the end of program indication. This synchronizes the clock calendar to the network clock, which is synchronous to the end of the program.

A specific embodiment includes a device for receiving a second compressed code representative of, and compressed in length from, the combination of a channel, a time-of-day, and a length of time for a second program immediately following the first program on the first channel and on the same day as the first program. A decoder decodes the second compressed code into a second channel, a second time-of-day, and a second length of time. To determine whether the entered compressed codes are valid, it is then determined whether the decoded first channel equals the decoded second channel and whether a sum of the first time-of-day and the first length of time equals the second time-of-day.

In another embodiment, an apparatus for synchronizing a clock to a network clock includes a picture in picture device for displaying a reduced video display of a program currently being received on a tuned to channel on a first portion of a television screen. Program schedules are stored, the program schedules including for each program a compressed code for the program, the compressed code representative of, and compressed in length from, the combination of a channel, a time-of-day, and a length of time for the program. A clock calendar is included for providing a current day and a time. The time on the clock calendar may be inaccurate before the clock calendar is synchronized to the network clock. On a second portion of the television screen, a program schedule for the current day for the tuned to channel is displayed. A device is provided for selecting a program entry in the program schedule corresponding to the program on the tuned to channel currently being received and displayed on the first portion of the television screen. The stored program schedules are read to access a first compressed code corresponding to the selected program entry. A decoder decodes the first compressed code into a first channel, a first time-of-day, and a first length of time. A device is provided for receiving an end of program indication for the program on the tuned to channel. The sum of the first time-of-day and the first length of time is loaded into the clock calendar in response to receiving the end of program indication, which synchronizes the clock calendar to the network clock.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIGS. 7A, 7B and 7C are flow diagrams of a method for synchronizing a clock to a network clock according to the present invention;

FIG. 16 is a timing diagram showing the vertical blanking interval (VBI) lines of field 1 and field 2 of an interlaced raster scanning pattern of a conventional television and data in the VBI according to the present invention.

DETAILED DESCRIPTION

Figure 1:
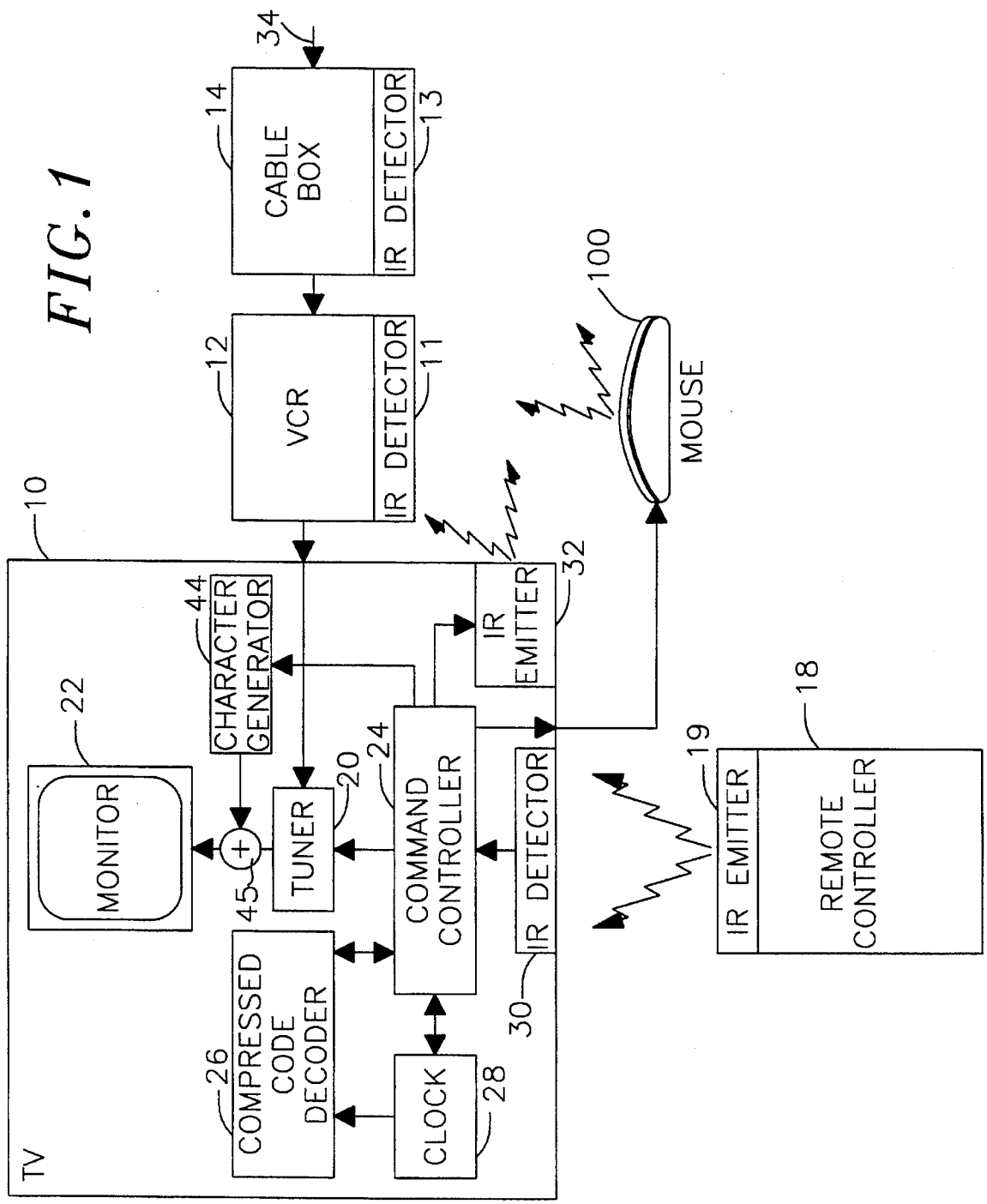
FIG. 1 is a diagram of a system for controlling a video system according to the present invention.

Referring now to the drawings, and more particularly, to FIG. 1, a video system is shown which includes a cable box 14, a VCR 12, and a television (TV) 10. The television 10 includes a tuner 20 and monitor 22 and in addition includes a command controller 24, compressed code decoder 26, clock 28, IR detector 30, and IR emitter 32. A remote controller 18 with an IR emitter 19 can be used to send commands to TV 10 via IR detector 30. The TV 10 can then control the VCR 12 and the cable box 14 via command controller 24 and IR emitter 32 or an infrared transmitter on mouse 100. The mouse emits infrared signals and can be placed adjacent to the VCR 12 and/or the cable box 14. Both the cable box and the VCR have IR detectors 13 and 11, respectively. The input to the cable box is a television signal source 34, which can be, for example, a cable input. The command controller 24 can consist of a microcomputer including a CPU, a ROM, a RAM, IO ports, timers, and counters. The compressed decoder 26 can be used to decode compressed codes, as described in U.S. Pat. No. 5,335,079. The compressed codes can be input from remote controller 18 to the television 10, and used to control recording of programs by VCR 12, or used by television 10 to control tuner 20. For example, the tuner 20 can be controlled to enable only certain programs or certain channels to be displayed on monitor 22. Other channels not enabled are blocked from monitor 22.

Figure 2:
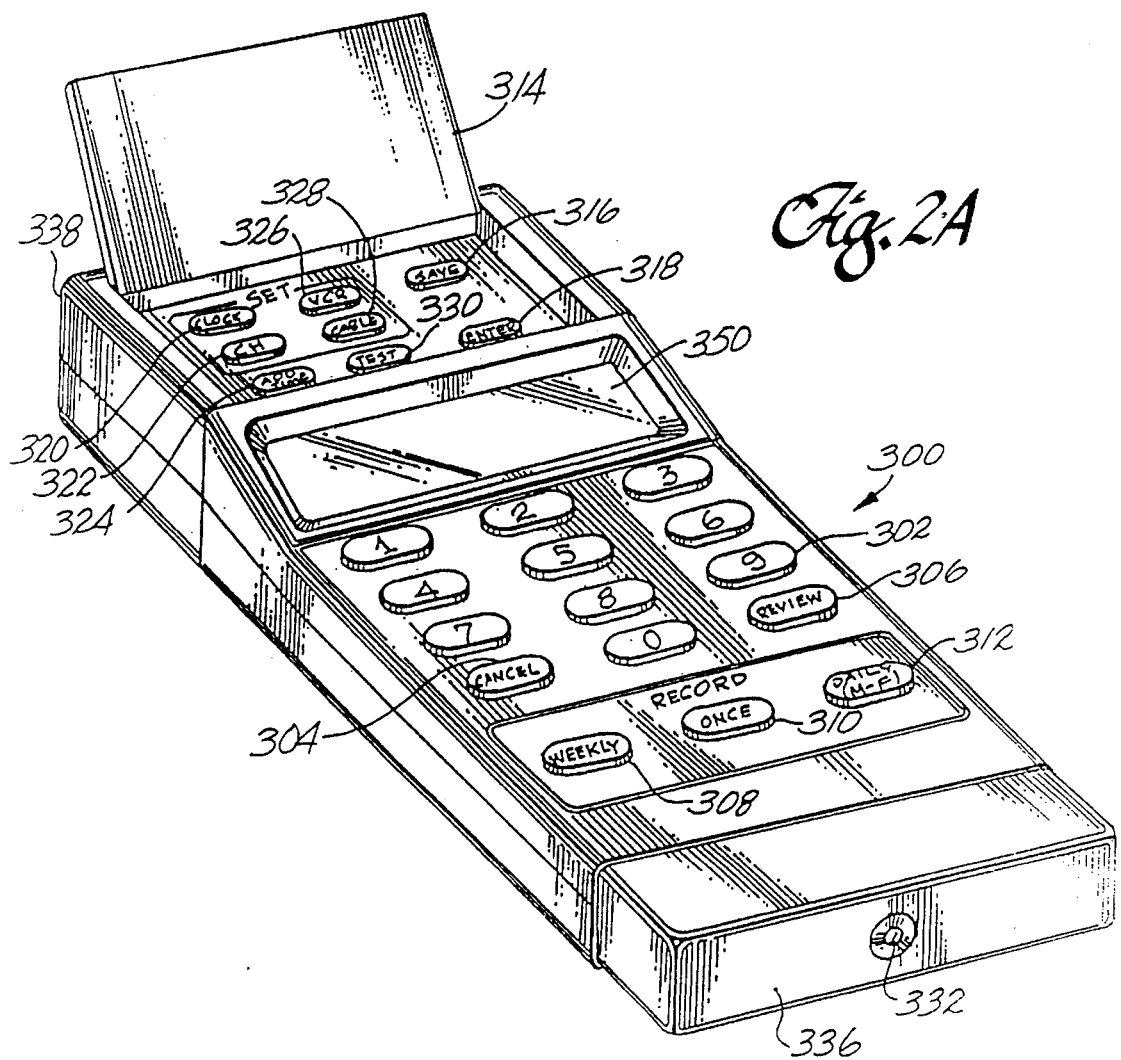
FIG. 2A is a perspective view of an apparatus for using compressed codes for recorder preprogramming.
FIG. 2B is a perspective view of a custom programmer having the features of the apparatus of FIG. 2A and a universal remote controller.

The remote controller 18 can also be used to directly control VCR 12. In a preferred embodiment the remote controller 18 can be an instant programmer for using compressed codes for recorder programming, as shown in FIG. 2A, or a custom programmer 500 as shown in FIG. 2B that performs all of the functions of the instant programmer while also performing the functions of a universal remote controller.

The operation of the instant programmer 300 is described in U.S. Pat. No. 5,335,079. The instant programmer 300 has number keys 302, which are numbered 0 through 9, a CANCEL key 304, a REVIEW key 306, a WEEKLY key 308, a ONCE key 310 and a DAILY (M–F) key 312. A lid normally covers other keys, which are used to setup the instant programmer 300. When lid 314 is lifted, the following keys are revealed: SAVE key 316, ENTER key 318, CLOCK key 320, CH key 322, ADD TIME key 324, VCR key 326, CABLE key 328, and TEST key 330. The instant programmer has a display 350. The custom programmer 500 has additional keys for performing the universal remote controller function, including TV key 506, cable key 508, VCR key 510, channel up/down keys 504 and volume up/down keys 505. By placing instant programmer 300 or the custom programmer 500 in front of the equipment to be programmed such as video cassette recorder 12, cable box 14, and television 10, as shown in FIG. 1, the instant programmer 300 or custom programmer 500 can transmit signals to control the television and to control program recording by VCR 12.

Figure 3:
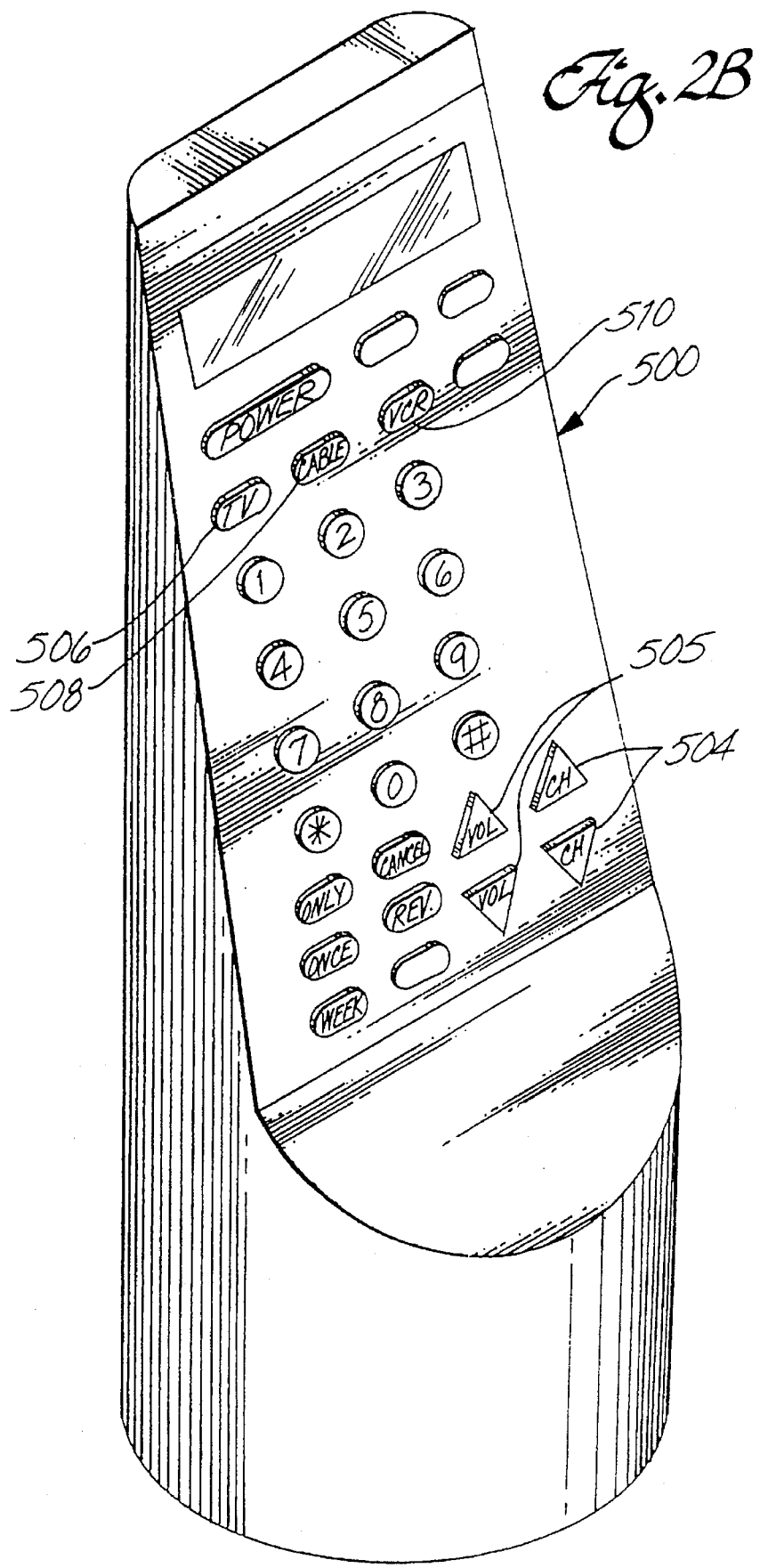
FIG. 3 is a schematic of the circuitry for implementing the apparatus of FIGS. 2A or 2B.

FIG. 3 is a schematic of the circuitry needed to implement the instant programmer 300 or the custom programmer 500. The circuity consists of microcomputer 380, oscillator 382, liquid crystal display 384, key pad 386, IR transmitters 390 and red warning light emitting diode 332. The microcomputer 380 consists of a CPU, ROM, RAM, I/O ports, timers, counters and clock. The ROM is used for program storage and the RAM is used among other purposes for stack storage of the programs to be recorded. The liquid crystal display 384 is display 350 of FIG. 2A. The key pad 386 implements all the previously discussed keys. The IR transmitters 390 consists of front infrared (IR) diode 340, left IR diode 342, down IR diode 344, two back IR diodes 346 and right IR diode 348, or another arrangement of IR diodes, which can communicate to the television, VCR, and cable box.

Initially, the user performs a setup sequence for the instant programmer 300 or the custom programmer 500. Since different VCRs and cable boxes have different infrared codes, the remote controller must be set up to work with the user's equipment. First, the user looks up the number corresponding to the model/brand of VCR to be programmed in a table, which lists the VCR brand name and a two digit code. Then with the VCR tuned to Channel 3 or Channel 4, whichever is normally used, the user turns the VCR "OFF". Then the user presses the VCR key 326. When the display shows VCR, the user presses the two-digit code looked up in the VCR model/brand table (for example 01 for RCA). The user points the instant programmer 300 at the VCR and then presses ENTER key 318. The red warning light emitting diode 332 will flash while it is sending a test signal to the VCR. If the VCR turned "ON" and changed to Channel 09, the user presses the SAVE key 316 and proceeds to the set clock step. If the VCR did not turn "ON" or turned "ON" but did not change to Channel 09 the user presses ENTER key 318 again and waits until red warning light emitting diode 332 stops flashing. The instant programmer 300 sends the next possible VCR code, while the red warning light emitting diode 332 is flashing. If the VCR turns "ON" and changed to Channel 09 the user presses SAVE key 318, otherwise the user presses ENTER key 318 again until the VCR code is found that works for the VCR. The display shows "END" if all possible VCR codes for that brand are tried. If so, the user presses VCR key 326 code 00 and then ENTER key 318 to try all possible codes, for all brands, one at a time.

Once the proper VCR code has been found and saved, the next setup step is to set the clock on instant programmer 300. First, the user presses the CLOCK key 320. When the display shows: "YR:", the user presses the year (for example 90), then presses ENTER key 318. Then the display shows "MO:", and the user presses the month (for example 07 is July), and then presses ENTER key 318. This is repeated for "DA:" date (for example 01 for the 1st), "Hr:" hour (for example 02 for 2 o'clock), "Mn:" minute (for example 05 for 5 minutes), and "AM/PM:" 1 for AM or 2 for PM. After this sequence, the display will show "SAVE" for a few seconds and then the display will show the current time and date that have been entered.

Next, if the instant programmer 300 is also to be used as a cable box controller, then the setup steps are as follows. First, the number corresponding to the model/brand of cable box (converter) to be controlled is looked up in a cable box model brand table, that lists cable box brands and corresponding two digit codes. The VCR is tuned to Channel 03 or 04 and turned "OFF". Then the cable box is tuned to Channel 02 or 03, whichever is normal, and left "ON". Then the CABLE key 328 is pressed. When the display shows: "CA B-:" the user enters the two digit code looked up in cable box model brand table, points the instant programmer 300 at the cable box (converter) and presses ENTER key 318. The red warning light emitting diode 332 will flash while it is sending a test signal to the cable box. If the cable box changed to Channel 09: then the user presses SAVE key 316; however, if the cable box did not change to Channel 09 the user presses ENTER key 318 again and waits until red warning light emitting diode 332 stops flashing, while the next possible code is sent. This is repeated until the cable box changes to Channel 09 and when it does the user presses SAVE key 316. If the display shows "END" then the user has tried all possible cable box codes for that brand. If so, the user presses cable code 00 and then ENTER key 318 to try all possible brand's codes, one at a time.

Figure 4:
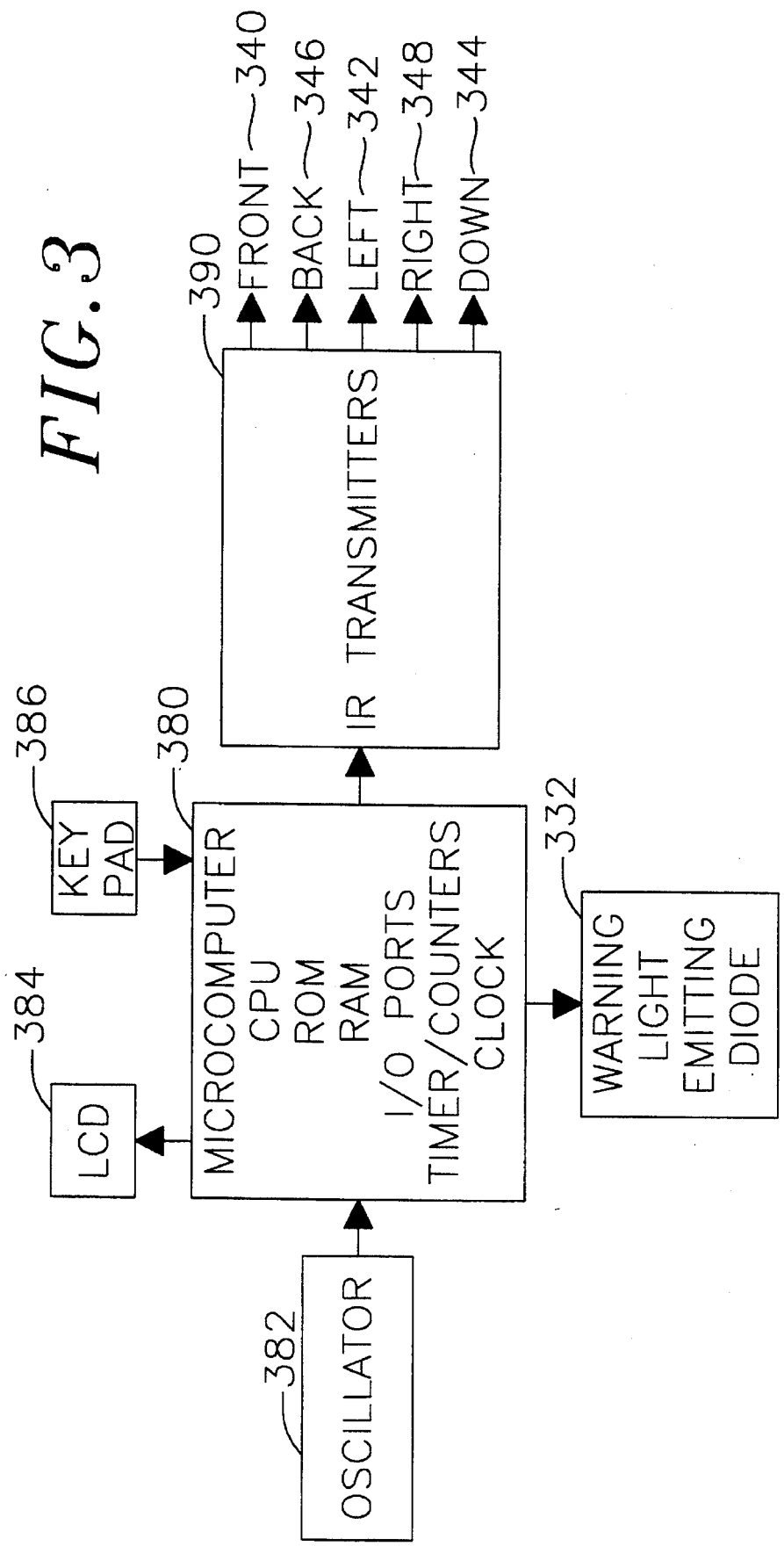
FIG. 4 is an illustration of part of a television calendar showing compressed codes for preprogramming a recorder for recording programs.

To operate the instant programmer 300 or the custom programmer 500 for recording programs on the VCR, the VCR should be left OFF and the cable box ON. The user looks up in the television guide the compressed code for the program, which he/she wishes to record. The compressed code 212 is listed in the television guide, as shown in FIG. 4. The compressed code 212 for the program selected by the user is entered into the instant programmer 300 or the custom programmer 500 by using the number keys 302 and then the user selects how often to record the program. The user presses the ONCE key 310 to record the program once at the scheduled time, or the user presses the WEEKLY key 308 to record the program every week at the same scheduled time until cancelled or the user presses the DAILY (M–F) key 312 to record the program each day Monday through Friday at the same scheduled time until cancelled. This is most useful for programs such as soapbox operas that air daily, but not on the weekend. To confirm the entry, the instant programmer 300 will immediately decode the compressed code and display the date, channel and start time of the program entered by the user. The length of the entered program is also displayed by time bars that run across the bottom of the display. Each bar represents one hour (or less) of program.

Then the user just needs to leave the instant programmer 300 near the VCR and cable box so that commands can be transmitted, and at the right time, the instant programmer 300 will turn "ON" the VCR, change to the correct channel and record the program and then turn the VCR "OFF". The user must just make sure to insert a blank tape.

Before using the instant programmer, users with cable or satellite must go through an additional setup procedure, because the cable or satellite channels are typically different for each cable and satellite carrier. To address this problem, all the cable channels are permanently assigned a unique assigned channel number, which is valid across the nation. For example, ESPN is assigned to channel 1, HBO to channel 2, SHO to channel 3, etc. These assigned channels are published by the television guide publications.

To set up the instant programmer for channel assignments, first, the user presses the CH key 322. The display will look like this: "Guide CH TV CH". Then the user enters the assigned channel number printed in the television guide or calendar and then the user enters the local channel number that the assigned channel is received on through his/her broadcast, satellite, or local cable company. Then the user presses ENTER key 318. For example, HBO may have assigned channel 33. The local channel for HBO may be 40. In this case the user presses the CH key and then enters 33 and 40 and then presses the ENTER key. This is repeated for each assigned channel number. When this procedure is finished the user presses SAVE key 316.

After the channel settings have been saved, the user may review the settings by pressing CH key 322 and then REVIEW key 306. By repeated pressing of the REVIEW key 306 each of the set channels will scroll onto the display, one at a time.

In an embodiment of the present invention, apparatus and methods are provided for setting a clock to the correct time. Apparatus and methods are also provided for synchronizing a clock to a network clock.

Figure 5:
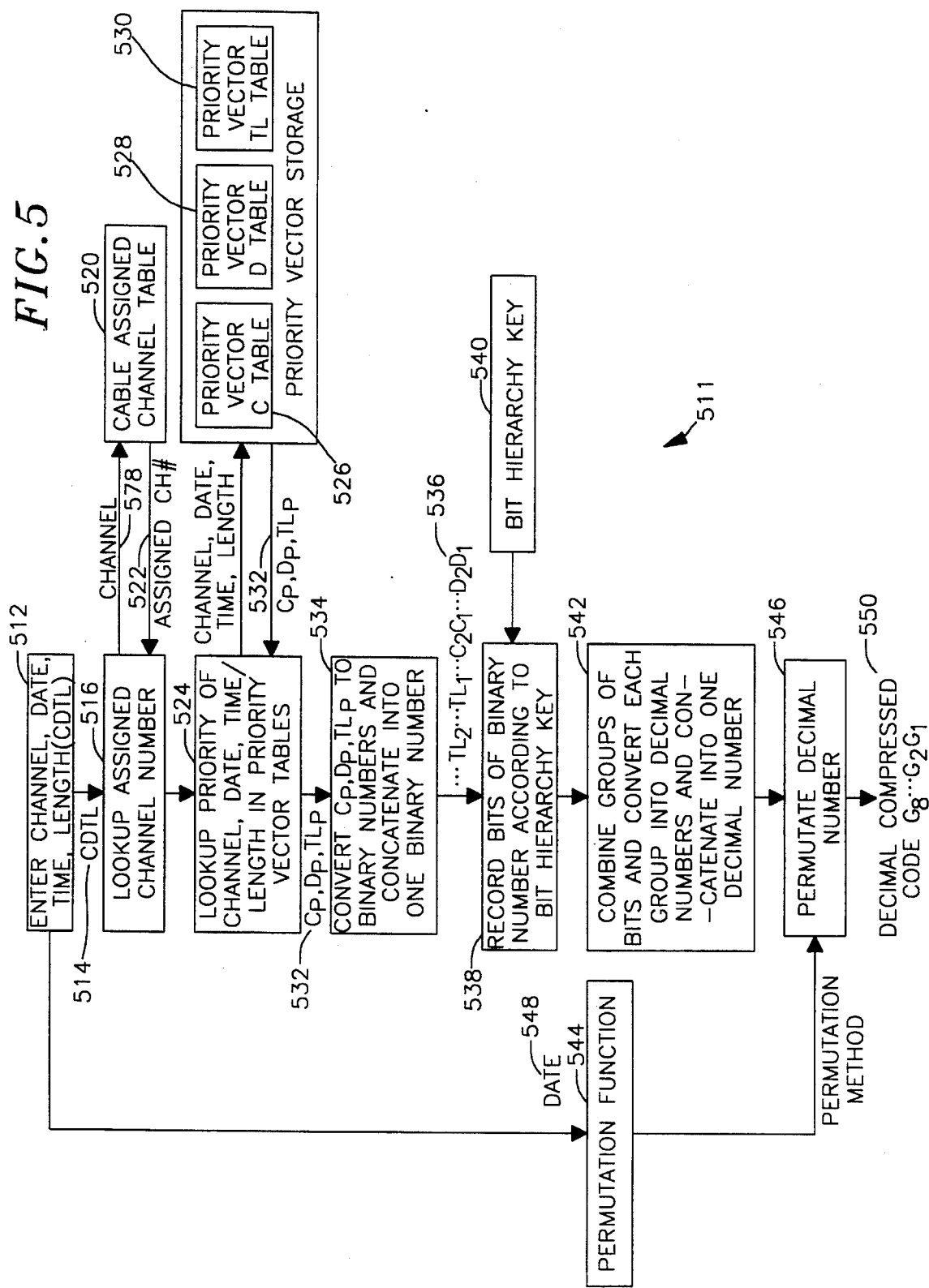
FIG. 5 is a flow graph for encoding program channel, date, time and length information into decimal compressed codes.

FIG. 5 is a flowchart of a method for encoding a channel, date, time-of-day and length (CDTL) into a decimal compressed code 550. This process is done "offline" and can be implemented on a general purpose computer and is done to obtain the compressed codes 212 that are included in the program guide or calendar of FIG. 4. The encoding method is described in U.S. Pat. No. 5,335,079. One preferred embodiment uses five bits for D, which can be denoted as $D_5 D_4 D_3 D_2 D_1$, and provides for 31 days in a month. The last encoding step is the permutate decimal number step 546, which permutes the decimal number according to permutation function 544 that is dependent on the date 548 and in particular the month and year and provides a security feature for the codes. After the permutate decimal number step 546, the result is the decimal compressed code $G_8 \ldots G_2 G_1$ 550, which is then included in a program guide or calendar in the same manner as compressed code 212 of FIG. 4.

Figure 6:
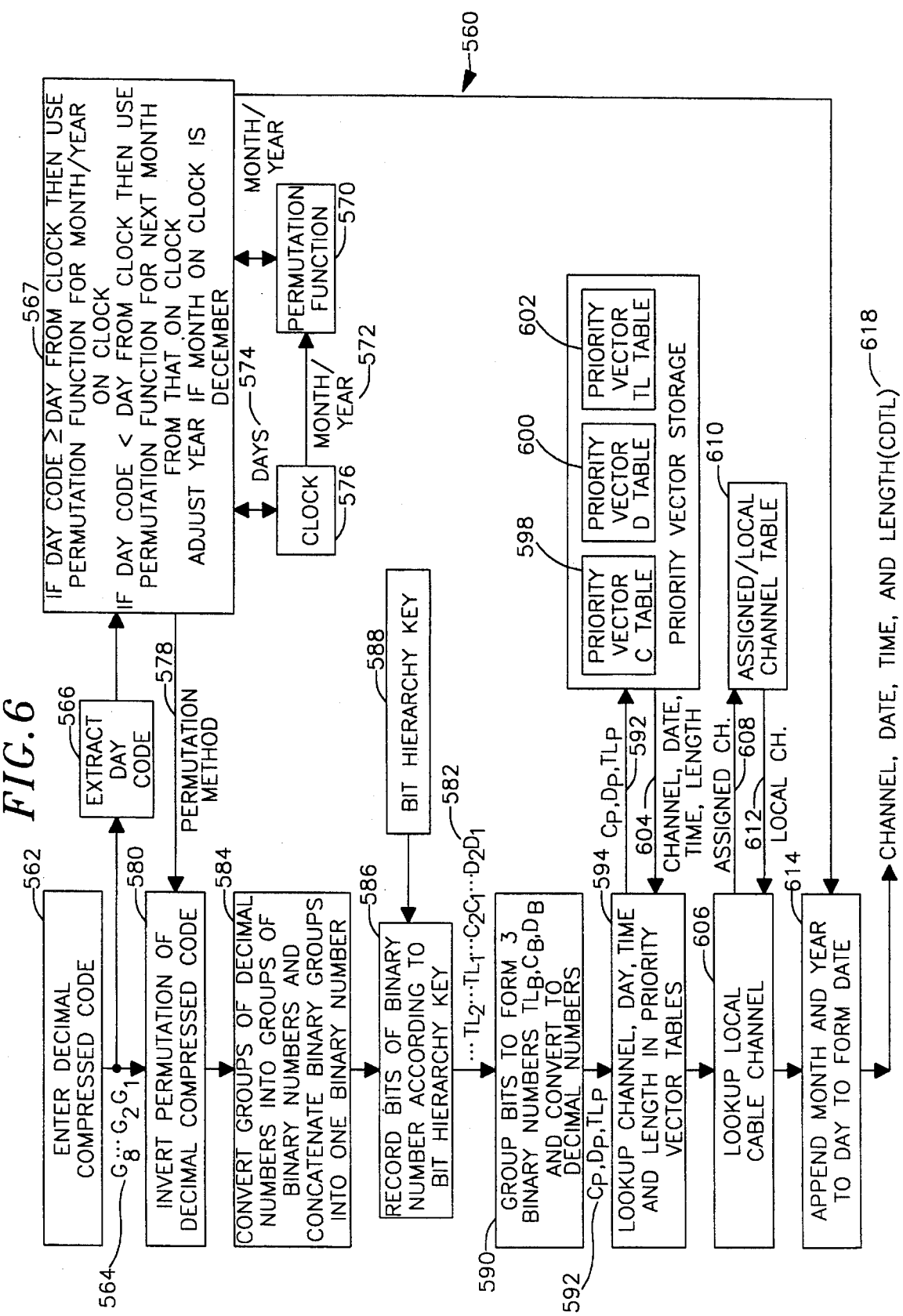
FIG. 6 is a flow graph for decoding decimal compressed code into program channel, date, time and length information.

FIG. 6 is a flowchart of the method for decoding a decimal compressed code 562 into channel, date, time and length 618. This process can be performed by compressed code decoder 26 of FIG. 1 or by microcomputer 380 of FIG. 3 in instant programmer 300 or custom programmer 500 or by a VCR. The decoding is described in U.S. Pat. No. 5,335,079. Once the decimal compressed code $G_8 \ldots G_2G_1$ 564 is entered in step 562, it is necessary to invert the permutation function of steps 544 and 546 of FIG. 5. The first step is to extract the day from the compressed code in step 566, which extracts the day for the program in the decimal compressed code. The day is an input to step 568, which also receives the current day 574 from the clock 576, which is implemented by microcomputer 380. The clock 576 also sends the current month and year to the permutation function 570, which is dependent on the month and year. Then step 568 performs the function: if day code is same or greater than the current day from the clock, then use permutation function for the month/year on clock, otherwise use the permutation function for next month after the month on the clock and use the next year if the month on the clock is December. In other words, since there is provision for preprogramming recording for one month or 31 days ahead, if the day for the program is equal to or greater than the current day of the month, then it refers to a day in the present month; otherwise, if the day for the program is less than the current day of the month, it must refer to a program in the next month. The extract day code step 566, which must be performed before the invert permutation of decimal compressed code step 580, is accomplished by apriori knowledge of how the permutate decimal number step 546 of FIG. 5 is performed relative to the day code information. The selected permutation method 578 is used in the invert permutation of decimal compressed code step 580.

Figure 7B:
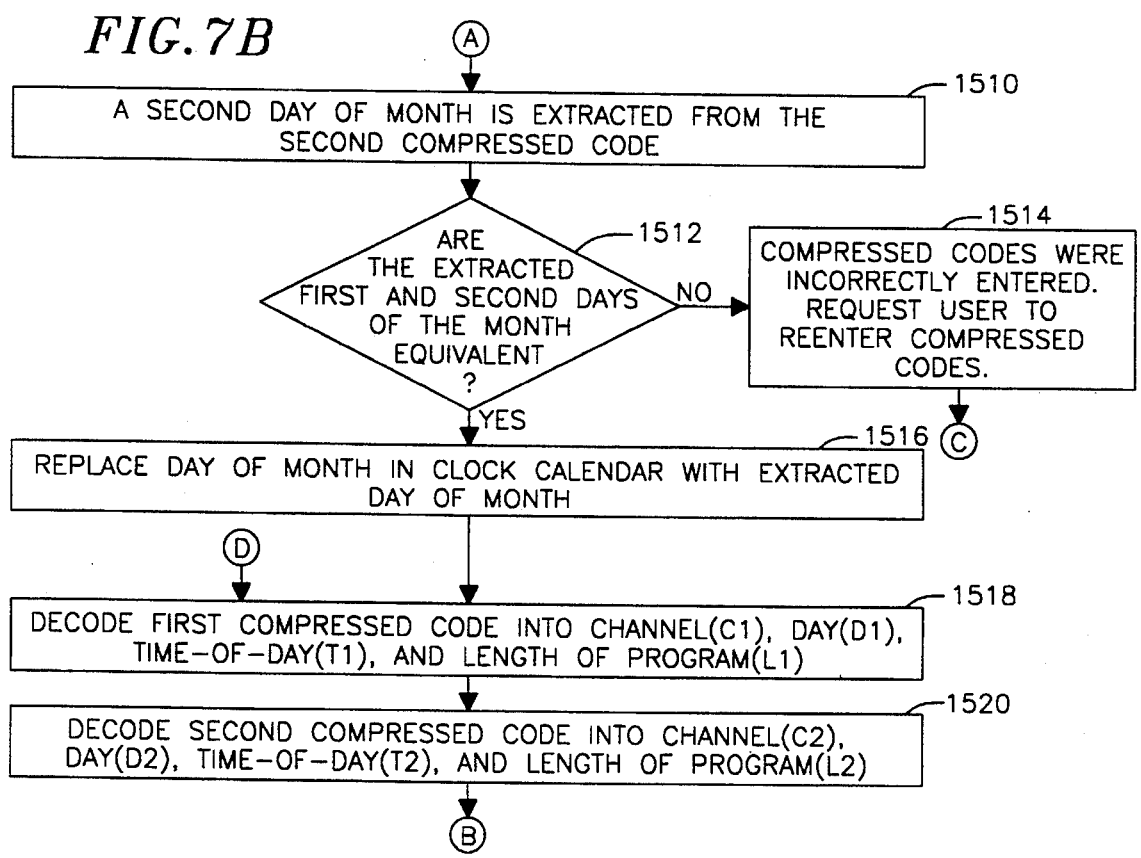
Figure 7C:
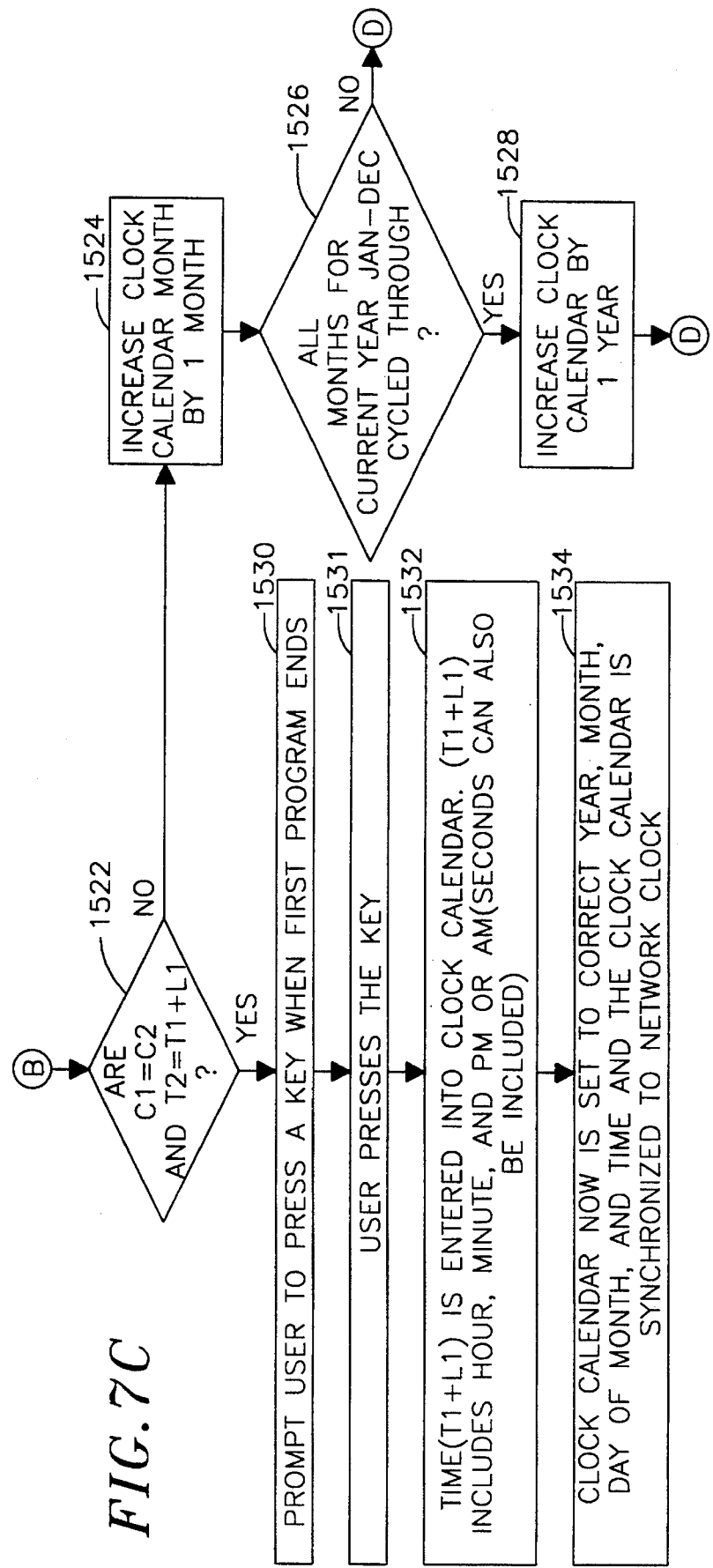

FIGS. 7A, 7B and 7C are flow diagrams of a method for synchronizing a clock to a network clock using compressed codes. In step 1500, it is assumed that when an instant programmer or an equivalent device is manufactured that a clock calendar in the instant programmer is set to a date equal to or earlier than the date of manufacture. For example, if the instant programmer is manufactured on Mar. 1, 1995, then the clock calendar might be set to Jan. 1, 1995 at 1:00.

In step 1502, it is stated that before the instant programmer device can be used for recorder programming using compressed codes, the clock must be set to the current date and time of day.

While viewing a program on a television, a user in step 1504 enters a first compressed code for the program currently being viewed on a channel on the television. This program is the so-called first program and the channel is the so-called first channel. The user can find the compressed code in a published television guide that contains compressed codes for programs.

In step 1506, the user enters a second compressed code for a second program immediately following the first program on the same date and on the same first channel as the first program. Then in step 1508, a first day of the month is extracted from the first compressed code. The day of the month can be extracted from the first compressed code by using step 566 shown in FIG. 6. Then in step 1510, a second day of month is extracted from the second compressed code using the same extract day code step 566.

In step 1512, it is determined whether the extracted first and second days of the month are equivalent. The extracted first and second days of the month should be equivalent because the compressed codes are both for programs on the same day. If in step 1512, the extracted first and second days are not equivalent, then in step 1514, the user is requested to reenter the compressed codes. If in step 1512, the extracted first and second days of the month are equivalent, then in step 1516, the day of the month and the clock calendar is replaced with the extracted day of month.

In step 1518, the first compressed code is decoded into a channel (C1), a day (D1), a time of day (T1) and a length of program (L1). Similarly, in step 1520, the second compressed code is decoded into a channel (C2), a day (D2), a time of day (T2), and a length of program (L2). The compressed codes are decoded according to the method of FIG. 6. Then in step 1522, it is determined whether C1 equals C2 and whether T2 equals T1 plus L1. C1 should equal C2 because the first and second compressed codes are for programs on the same channel. T2 should equal to T1 plus L1 because the second program starts immediately following the first program. If in step 1524 is determined that C1 does not equal C2 or that T2 does not equal T1 plus L1, then the month on the clock calendar is incremented by one month. For example, if the month on the clock calendar is February, then the month is changed to March. In step 1526, it is determined whether all months (January through December) for the year on the clock calendar, have been cycled through. The purpose of changing the clock calendar month and for attempting decoding of the compressed codes and performing step 1522 for different months of the year in the clock calendar, is to determine the correct month that should be set into the clock calendar. As shown in FIG. 6, steps 567, 576 and 570, the method for decoding a compressed code is a function of the month and year entered into the clock 576. Thus, if the wrong month is entered into the clock calendar, the first and second compressed codes will not be properly decoded. Thus, in steps 524 and 526, the months for a particular year are cycled through and the compressed codes are decoded for each month entered into the clock calendar. Each time the month in the clock calendar is changed in step 1524, if all months have not been cycled through as determined in step 1526, then step 1518 is repeated. If all of the months have been cycled through as determined in step 1526, then the year on the clock calendar is increased by one year in step 1528 and step 1518 is repeated. Eventually, the correct month and year are entered into the clock calendar. When the correct month and year are entered into the clock calendar, then the first and second compressed codes decode properly and C1 equals C2 and T2 equals T1 plus L1. Then in step 1530, the user is prompted to press a key when the first program ends. The key that the user presses, for example, can be the enter key 318 on FIG. 2A or a similar key on the controller shown in FIG. 2B. The user must watch the program and when it ends, the user presses the key in step 1531. Then in step 1532, the time T1 plus L1 is entered into the clock calendar. The time T1 plus L1 includes the hour and the minutes, including AM or PM. The time can also include seconds. As indicated in step 1534, the clock calendar is now set to the correct year, month, day of the month, and time. The clock calendar is also synchronized to the network clock.

A disadvantage of the foregoing method is that it depends upon the user pressing a key at the proper time in step 1531.

Figure 8A:
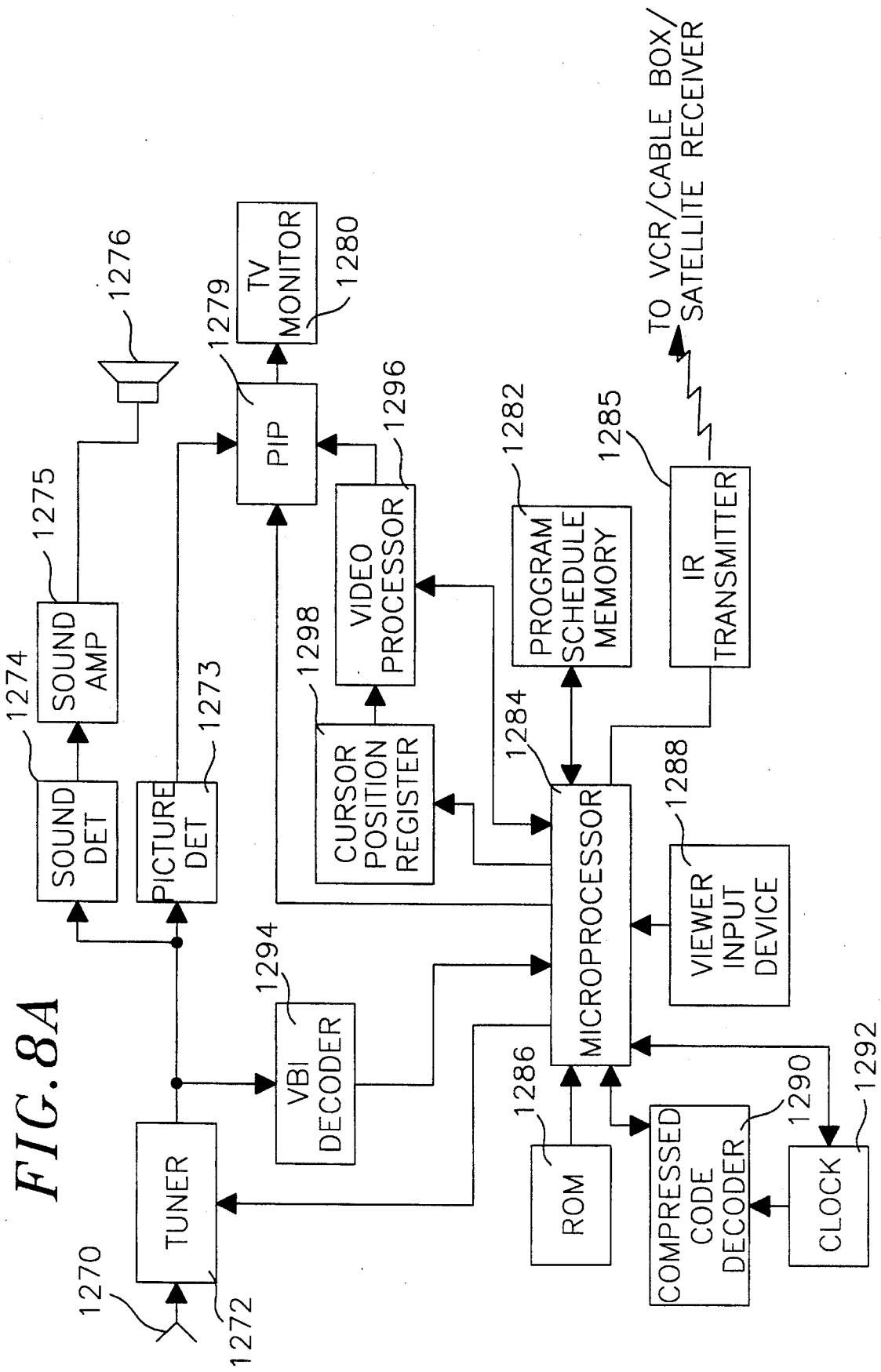
FIG. 8A is a schematic block diagram of a television receiver according to the present invention.

In another embodiment of the present invention, an electronic program guide is displayed on a television and can be used for synchronizing a clock to a network clock. U.S. patent application Ser. No. 08/369,522, filed Jan. 5, 1995, which is hereby incorporated herein as though set forth in full, describes such an electronic program guide. As shown in FIG. 8A, a source of television signals 1270, such as a terrestrial antenna, a cable or a satellite receiver is connected to a television tuner 1272. The output of tuner 1272 contains video and audio television information and is connected to a picture detector (PICTURE DET) 1273 and a sound detector (SOUND DET) 1274, which produce base band video and audio signals, respectively. The audio signal is coupled by a sound amplifier (SOUND AMP) 1275 to a loudspeaker 1276. The video signal is coupled by a video amplifier (not shown) to one input of a conventional picture-in-picture (PIP) integrated circuit chip 1279. The output of PIP chip 1279 is connected to the video input of a television monitor 1280.

An updatable data base of the schedule of program listings of all the available channels for a prescribed period of time, e.g. a day or a week, is electronically stored in a program schedule memory 1282. The program schedule can be periodically loaded into program schedule memory 1282 via a media (not shown), such as a floppy disk, that is read into the memory via the microprocessor 1284. Alternatively, the program schedule can be periodically sent embedded in the television signals 1270. For example, the program schedule can be embedded in the vertical blanking interval lines of the television signals and retrieved by vertical blanking interval (VBI) decoder 1294, which is coupled to the output of tuner 1272 and to microprocessor 1284. U.S. patent application Ser. No. 08/364,708, filed Dec. 28, 1994 is incorporated herein by this reference as though set forth in full, and describes apparatus and methods for extracting a television guide from a television signal.

Figure 10:
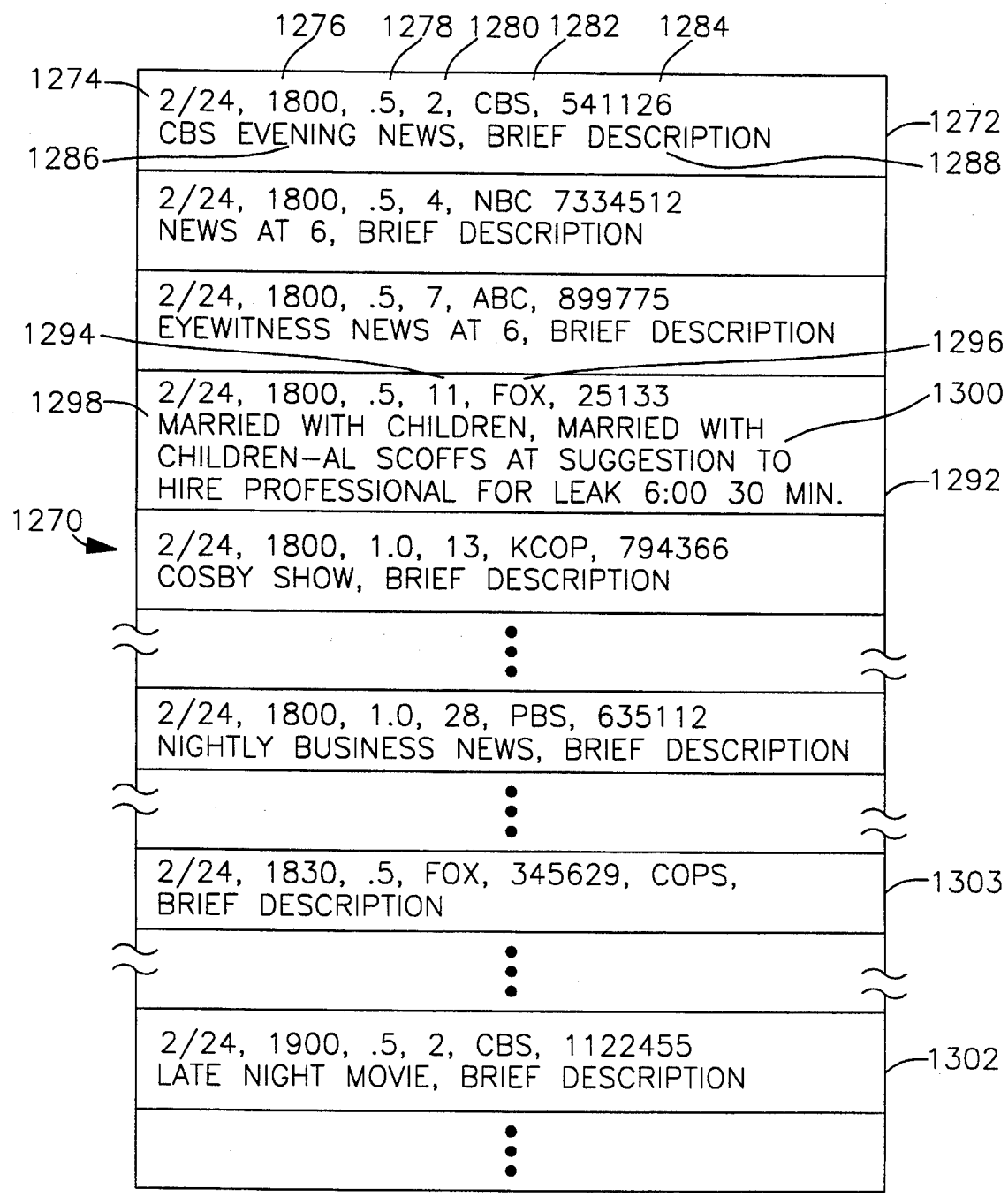
FIG. 10 is a diagram illustrating a portion of a program schedule according to the present invention.

The program schedule can be organized in a number of different formats. One format is to list the program schedule in order of date and time-of-day and channel for each program, as shown in FIG. 10. Each program in the program schedule 1270, as shown for program 1272 in FIG. 10 contains the day 1274, the time-of-day 1276 for the start of the program, length of the program 1278, the channel number 1280 for the program, the channel call letters 1282, the compressed code 1284 for the program, the program title 1286, and a brief description 1288 of the program. For example, the program listing 1292 for channel 11 (1294) on FOX 1296, has a title 1298 (MARRIED WITH CHILDREN), and a brief description 1300, which is "Married with Children–A1 scoffs at suggestion to hire professional for leak, 6 PM, 30 min." Since the listings are in time order, listing 1302 for 2/24 at 1900 is listed after the listings for 2/24 at 1800.

Figure 8B:
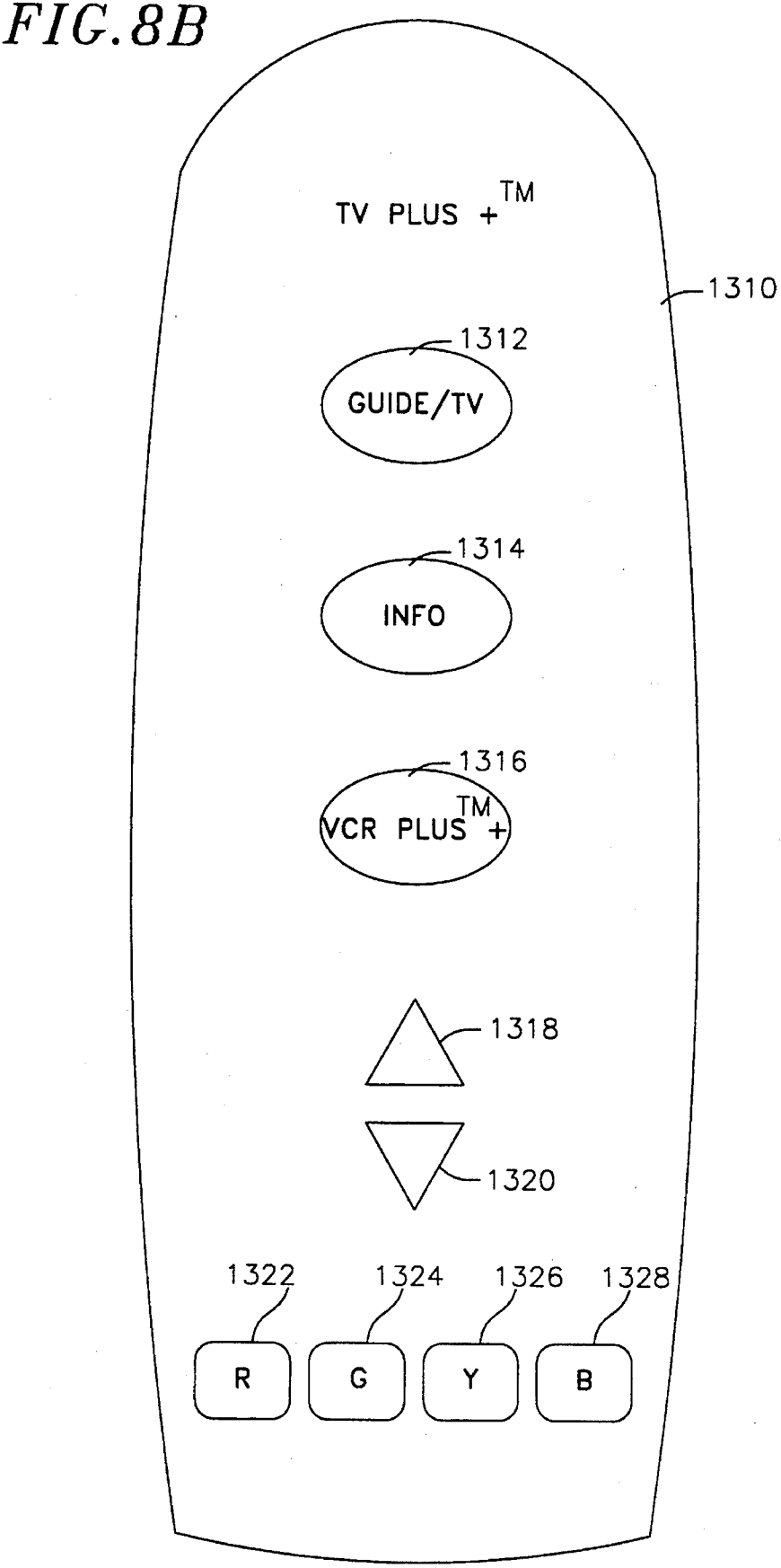
FIG. 8B is a view of a remote controller for providing a viewer input device according to the present invention.

An operating program for microprocessor 1284 is stored in a read only memory (ROM) 1286. A viewer input device 1288, preferably in the form of a remote controller 1310, as shown in FIG. 8B, is coupled to microprocessor 1284 to provide commands from the viewer. A video processor 1296 is coupled to microprocessor 1284. When the viewer wishes to see television program listings, the viewer presses GUIDE/TV button 1312 on remote controller 1310 and the microprocessor 1284 recalls a portion of the program schedule data base from memory 1282 and couples it to video processor 1296, where the program listings are formatted for display. Preferably, the information stored in video processor 1296 is a bit map of what is displayed on the screen of television monitor 1280. Video processor 1296 is connected to another input of PIP chip 1279. Preferably, input device 1288 controls microprocessor 1284 by cursor movement on the screen of television monitor 1280. To this end, microprocessor 1284 and video processor 1296 are coupled to a cursor position register 1298. Alternatively, the viewer can select items of information displayed on the screen by keying numbers assigned to these items into viewer input device 1288. Microprocessor 1284 is also coupled to tuner 1272 for changing channels and to PIP chip 1279 for selection of the mode of PIP operation. The microprocessor is also connected to IR transmitter 1285 for sending commands to a VCR, cable box, and/or satellite receiver. For example, the commands can be channel timing commands.

Figure 9:
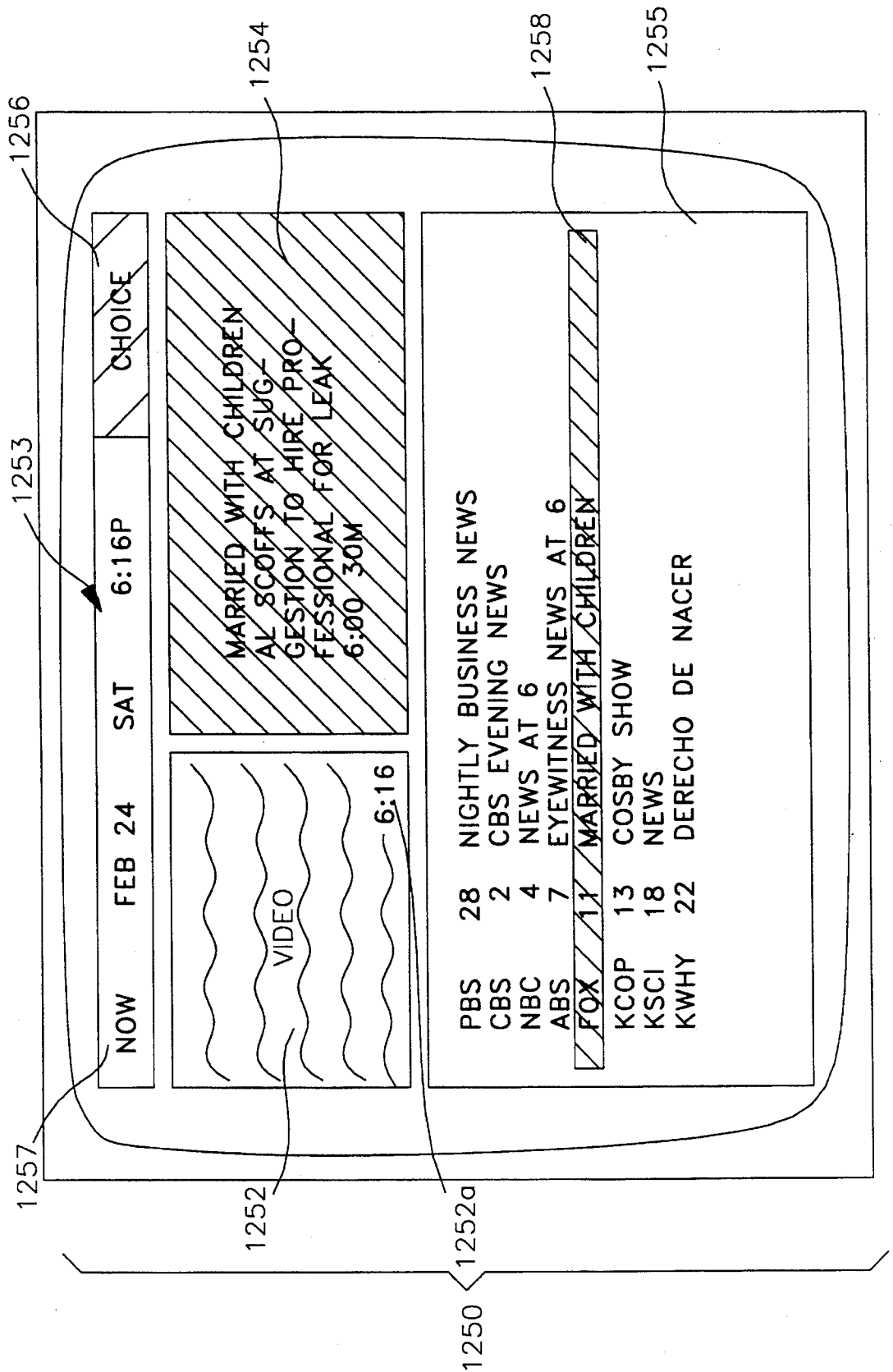
FIG. 9 is a television screen formatted according to the present invention.

The format of an electronic program guide according to the present invention is shown in FIG. 9. The format has a background area 1250 and an overlayed PIP window 1252 in the upper left-hand corner of the screen. The real time, i.e., 6:16 p.m., is displayed in a sub-area 1252a of PIP window 1252. Background area 1250 includes a banner and message prompting area 1253 at the top of the screen, a program description area 1254 in the upper right-hand corner of the screen adjacent to PIP window 1252, and a program schedule area 1255 below areas 1252 and 1254. Program description area 1254 includes the start time and length (duration) of the program being described, as shown by program description 1300 for program 1292 in FIG. 10. The viewer can move a cursor 1258 vertically to highlight one of the program listings displayed in area 1255. The highlighted background of cursor 1258 and the background of program description area 1254 are the same color or shade. The real time moving images of a currently broadcast television program and the current time are displayed in PIP window 1252 and the audio portion of the television program displayed in PIP window 1252 is reproduced by the television sound system.

The format shown in FIG. 9 is a time specific format of the electronic program guide, namely a version that displays program listings of television programs being broadcast at the current time. Program schedule area 1255 has a column for channel name or call letters, a column for channel number, and a column for program title. Each line of area 1255 represents a separate program listing.

All four areas of background 1250 are formatted in video processor 1296. The memory space of video processor 1296 corresponding to the area in which PIP window 1252 appears on the screen is left blank; i.e., although overlaid on background area 1250, PIP window 1252 does not cover up any of the information of background area 1250. By means of a pair of up/down arrows on viewer input device 1288, the viewer can move cursor 1258 vertically to highlight the listing of one of the currently playing television programs displayed in area 1255. Preferably, to reduce delays in displaying the program schedules, all the program listings for the particular screen format are stored in video processor 1296, even though only a fraction of them are displayed at the same time. When the cursor reaches the top or bottom listing in area 1255, microprocessor 1284 recalls further program listings from video processor 1296 for display on the screen of television monitor 1280.

The PIP display, the sound reproduction, and the program description in area 1254 enable the viewer to assess better whether or not to watch the highlighted program.

In a program selection mode, as the viewer moves cursor 1258 vertically from program listing to program listing in area 1255 of FIG. 9, the current television program displayed in window 1252 and the program description displayed in area 1254 automatically change accordingly to match the highlighted program in area 1255. As the cursor moves from one program listing to another, tuner 1272 is set to the channel for the highlighted program listing and/or commands are sent to a cable box, VCR or satellite receiver to change channels, so that the program can be displayed in PIP window 1272. The microprocessor 1284 recalls the program description for the highlighted listing from program schedule memory 1282, and video processor 1296 formats this program description so it can be displayed in area 1254.

The viewer input device 1288 preferably takes the form of a hand-held remote infrared (IR) transmitter which communicates with an infrared receiver connected to microprocessor 1284. As shown in FIG. 8B, the remote 1310 has a housing on which a number of control buttons are mounted. A GUIDE/TV button 1312, an INFO button 1314, and a VCR PLUS+ button 1316 are located above up and down arrow buttons 1318 and 1320. A row of buttons 1322, 1324, 1326 and 1328 which are marked with the colors red (R), green (G), yellow (Y), and blue (B), respectively, underlie down arrow button 1320. Red, green, yellow, and blue prompts are displayed in area 1253 of the electronic guides. To select a prompt on the screen, the button of the IR transmitter having the corresponding color is pressed, i.e., to select the blue prompt on the screen, blue button 1328 is pressed.

The viewer enters the electronic guide by pressing GUIDE/TV button 1312 on the remote controller. Then the electronic program guide shown in FIG. 9, which is a guide showing programs currently being received, as indicated by NOW in subarea 1257, is displayed on the screen. The user may cursor up and down the program listings in area 1255 to select a particular program. In the program selection mode, a user selects a program by moving a cursor to the corresponding program listing in area 1255. Then the user again presses the GUIDE/TV button 1312 and the program display is switched from the PIP area 1252 to the entire television screen 1250.

Figure 11A:
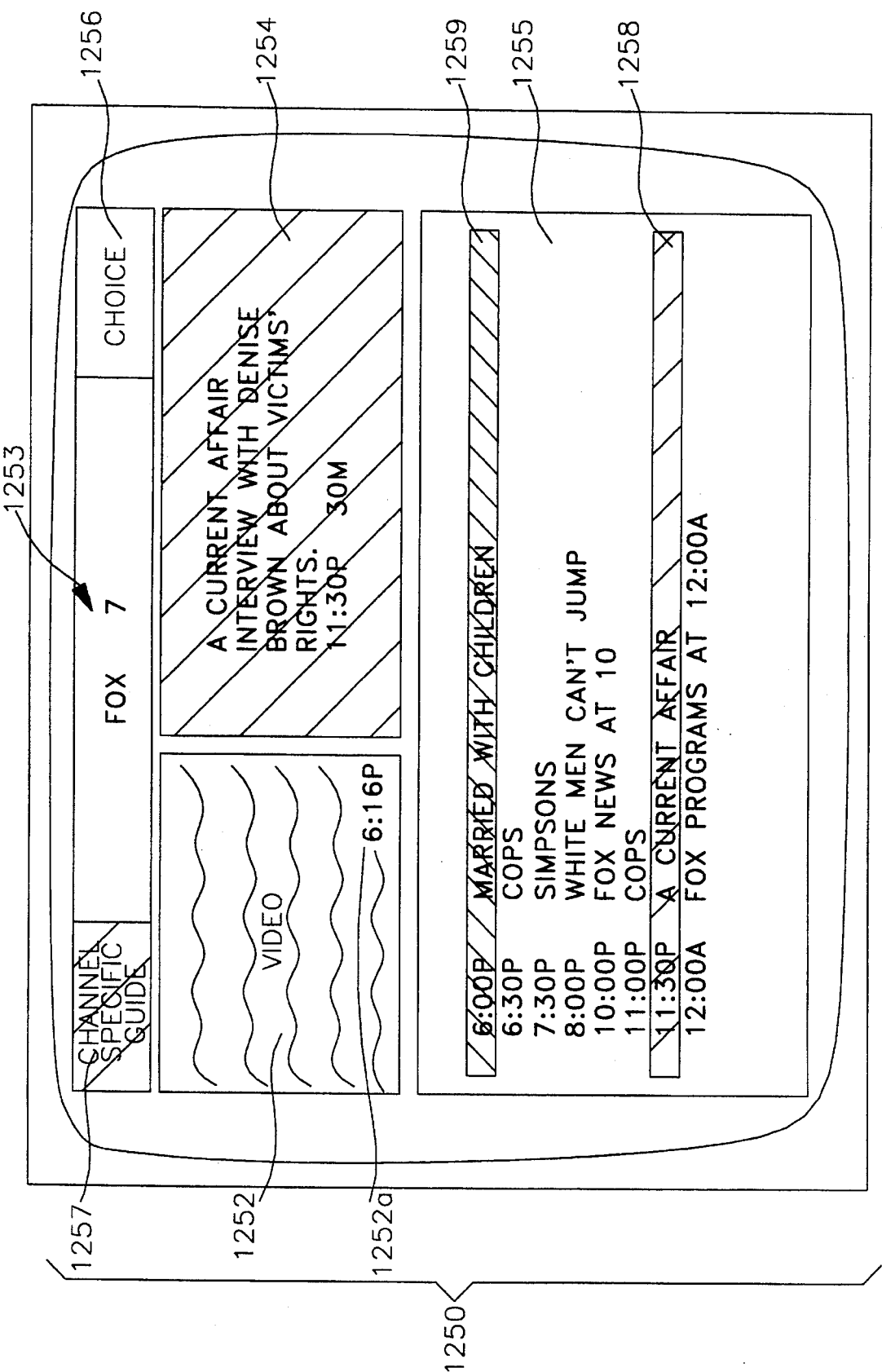
FIGS. 11A and 11B are television screens formatted according to the present invention.

In FIG. 11A, a channel specific program guide (CSPG) screen format is shown, which is another format of the electronic program guide that can be provided with the apparatus of FIG. 8A. All the program listings for a selected channel, i.e., FOX Channel 7, are displayed in area 1255, from the currently broadcast program 1259 into the future for a specified time period, e.g., 24 hours or until the end of the day. Area 1255 has a column for time and a column for program title. Each line of area 1255 represents a separate program listing. The moving, real time images of the current television program are displayed in PIP window 1252. If the cursor also highlights the current program, a brief program description of the current program is displayed in area 1254. If the cursor highlights another program listing, such as listing 1258, a brief program description of the highlighted program is displayed in area 1254 and the current program is identified in banner 1259 by time and title.

Figure 11B:
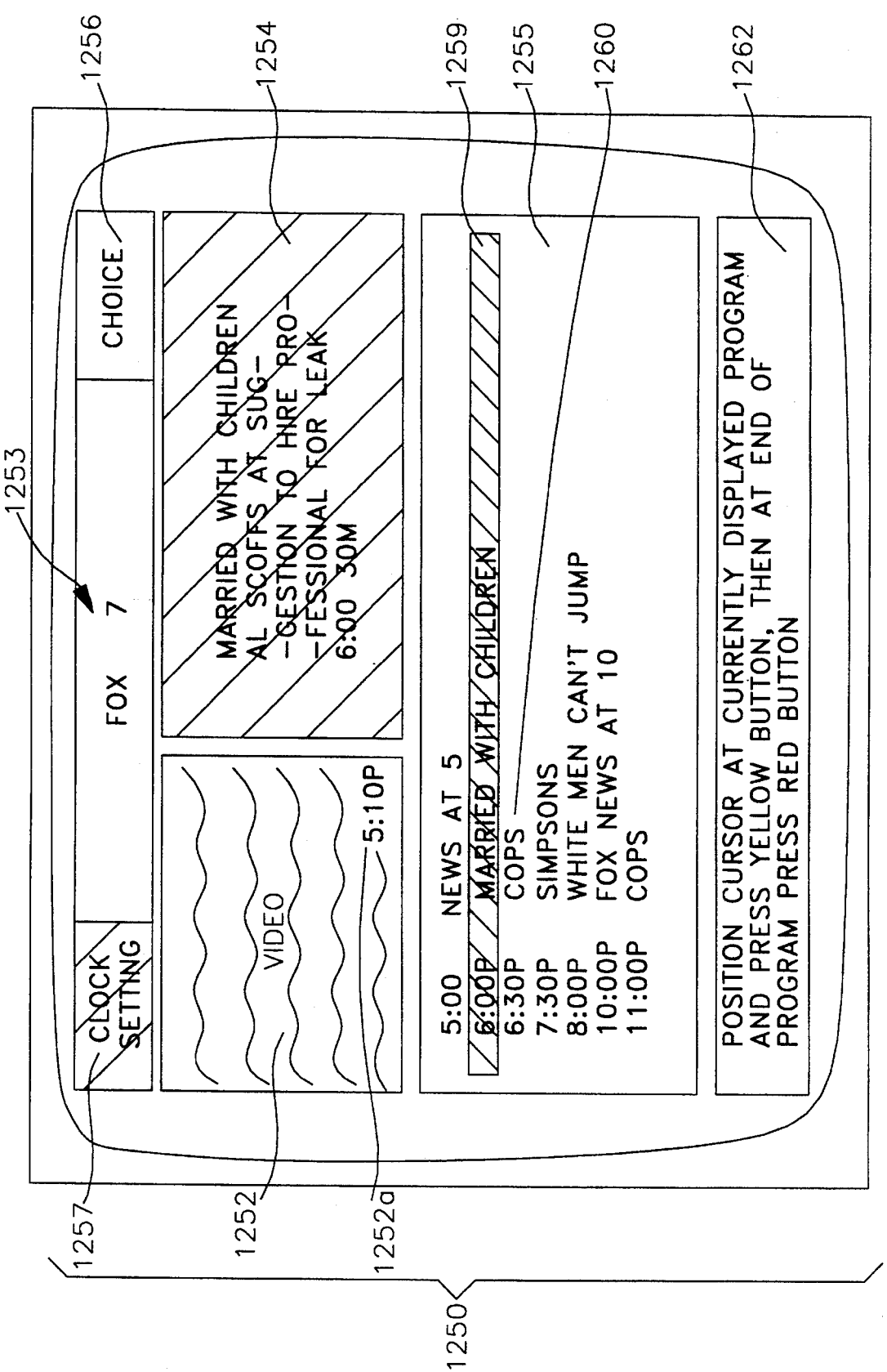

A screen format similar to the channel specific program guide (CSPG) screen format of FIG. 11A can be used to synchronize clock 1292 in FIG. 8A to the network clock. FIG. 11B shows a clock setting screen format, which is another format of the electronic program guide that can be provided with the apparatus of FIG. 8A. The user can enter a clock setting mode by selecting CHOICE 1256 by pressing a corresponding color coded key on remote 1310, such as green button 1324, which will cause video processor 1296 to display on the television monitor 1280 mode selections (not shown), one of which is a clock setting mode. One way of displaying mode selections is to use banner area 1253 to display color coded subareas for each mode. When the clock setting mode is selected then the television screen is formatted to appear as shown on FIG. 11B and the banner area 1253 indicates the mode by CLOCK SETTING 1257.

When in the clock setting mode using the apparatus of FIG. 8A, it is assumed that the clock calendar 1292 has been already set to the proper year, month, and day of the month, but that the time-of-day is incorrect or not correctly synchronized to the network clock. By using the clock setting mode the user can accurately synchronize the time on clock 1292 with the network clock.

Since the year, month and day of the month are known, the program schedule for the correct day can be accessed from memory and displayed in area 1255. If the user tunes to channel 7, then all the program listings for the selected channel, e.g., FOX Channel 7, are displayed in area 1255. Area 1255 has a column for time and a column for program title and each line of area 1255 represents a separate program listing. The moving, real time images of the current television program on the selected channel are displayed in PIP window 1252. Since the time on clock 1292 may be incorrect, the time displayed in subarea 1252a may be incorrect. Suppose for example, that the real time is 6:16 P.M., but that the time on clock 1292 is 5:10 P.M. Then the time shown in subarea 1252a, which is read from clock 1292, is displayed as 5:10 P.M., as shown in FIG. 11B. The goal of the clock setting mode is to properly set clock 1292 and to synchronize the clock 1292 setting to the network clock. In this case the network clock is the clock used by FOX channel 7 for starting and stopping programs.

When in the clock setting mode, the user is requested via banner 1262, shown in FIG. 11B, to position the cursor at the listing in area 1255 corresponding to the currently displayed program in area 1252. The user can do this by looking at his/her wristwatch, for example, and looking up the current program in a published program guide or the user can just select the correct program listing by watching the program shown in area 1252 until the user "knows" the correct program. For example, the user probably knows in general that it is 5 to 7 o'clock in the evening and so can position the cursor so that programs in that time frame are displayed in area 1255. Then by watching the video in area 1252, the user may be able to determine that the program being displayed in area 1252 is Married with Children. Also, the brief program description in area 1254 is for the program listing selected by the cursor, shown by highlighted area 1258. The user moves the cursor to the correct program listing, which in this case is the 6:00 P.M. listing for Married with Children. Then, the user presses the yellow button 1326 on remote controller 1310, as instructed in banner area 1262, thereby indicating that the program currently being broadcast and displayed in area 1252 corresponds to selected program listing.

Once the program listing is selected, the program schedule in program schedule memory 1282 is accessed and the compressed code for the selected program is accessed. For example, as shown in FIG. 10, the compressed code for Married with Children is 25133. Then the program schedule is again read to access the program listing for the next program on channel 11. In this case the next program, as shown in FIG. 11B, is the program COPS at 6:30 P.M. The program schedule memory 1282 is read to access the compressed code for the program COPS, which as shown in FIG. 10 element 1303, is 345629. When the compressed codes for Married with Children (25133) and for the program COPS (345629) are accessed, the compressed codes are decoded into: channel (C1), day (D1), time-of-day (T1) and length of program (L1); and C2, D2, T2 and L2, respectively. A check can be performed to verify that C1 equals C2. Since the programs follow one another on the same channel, the sum of T1 plus L1 should equal T2. If C1 does not equal C2 or if the sum of T1 plus L1 does not equal T2, then the user is warned that a mistake has occurred.

If C1 does equal C2 and if the sum of T1 plus L1 equals T2, then the user is requested to press red button 1322 at the end of the program being displayed in area 1252, which in this case is the program Married with Children. When the red button 1322 is pressed, the clock 1292 in FIG. 8A is synchronized to the network clock.

Figure 12A:
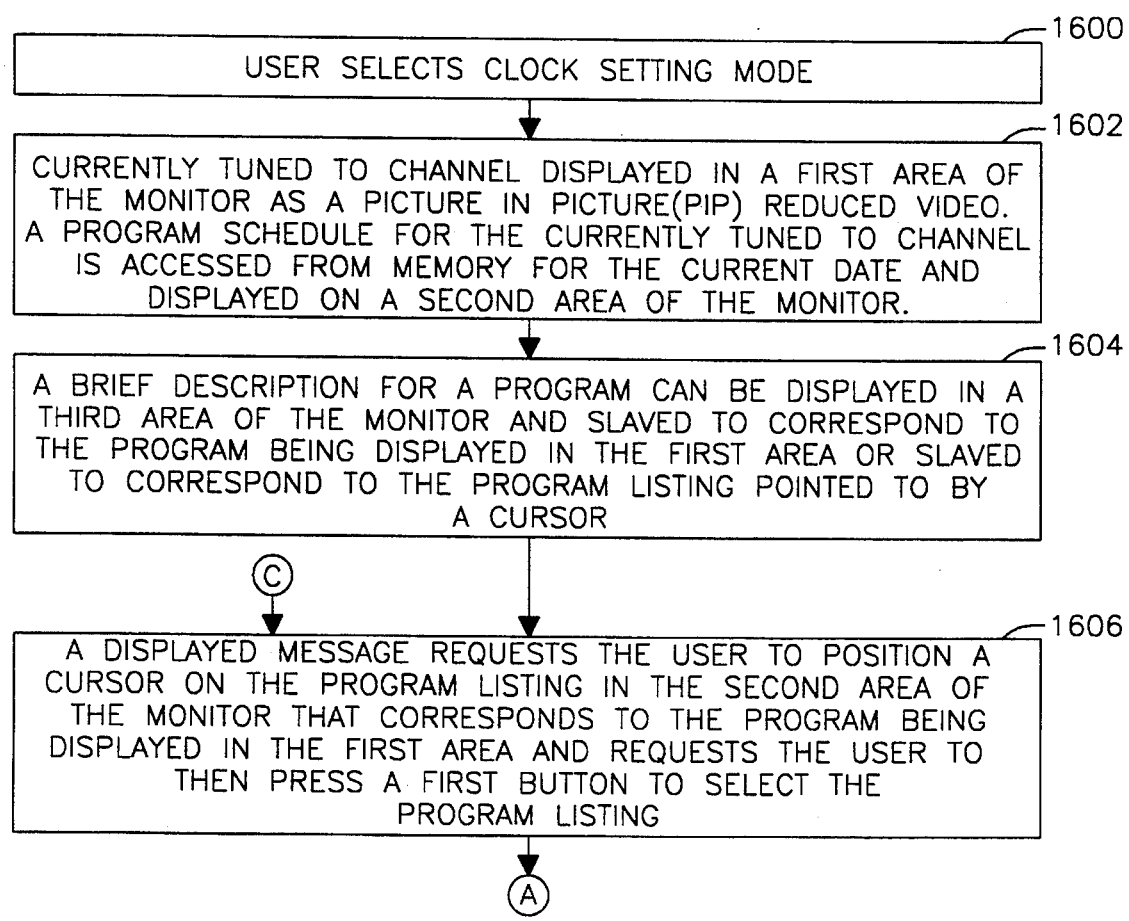
FIGS. 12A, 12B and 12C are flow diagrams of a method for synchronizing a clock to a network clock according to the present invention.
Figure 12B:
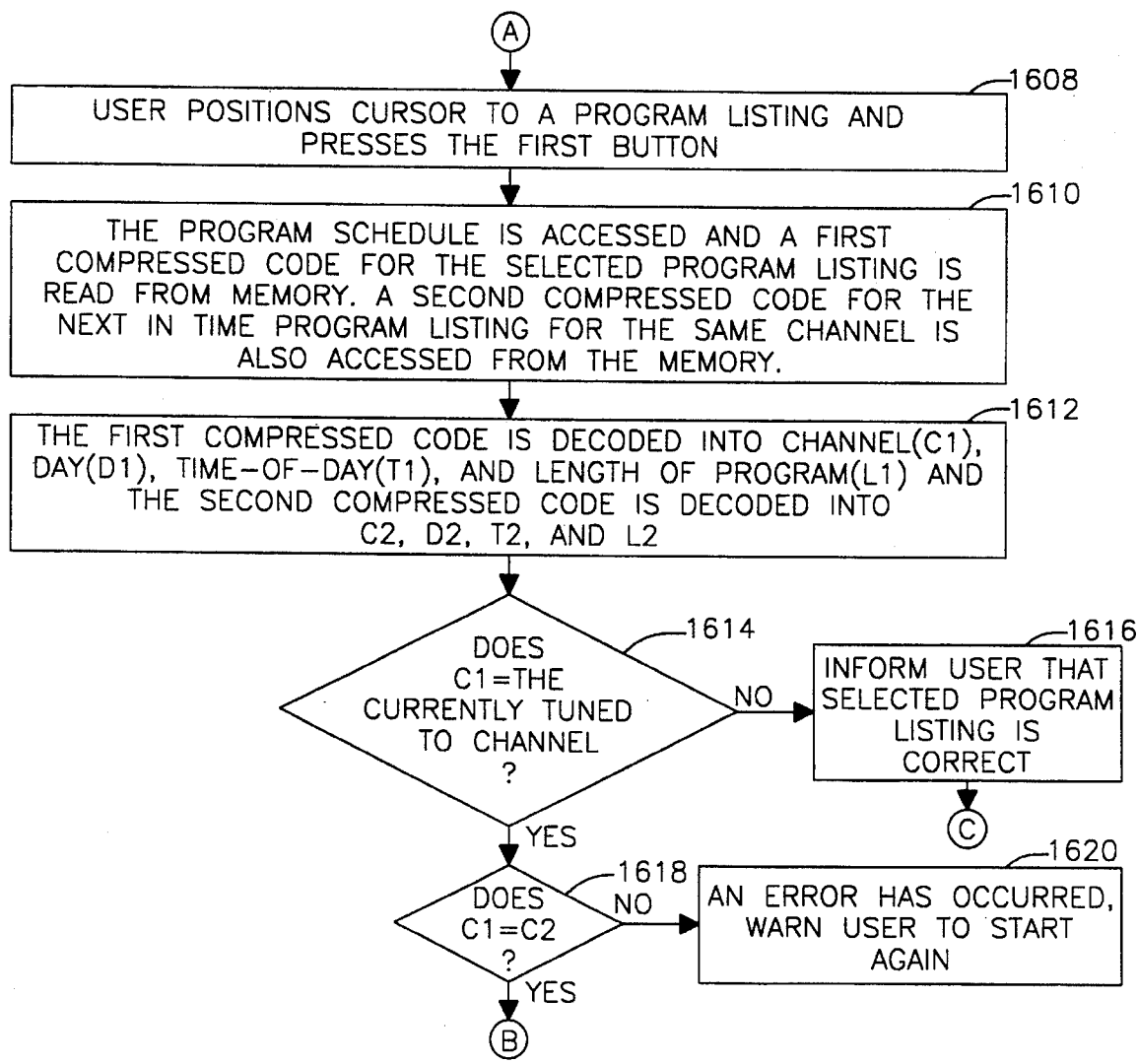
Figure 12C:
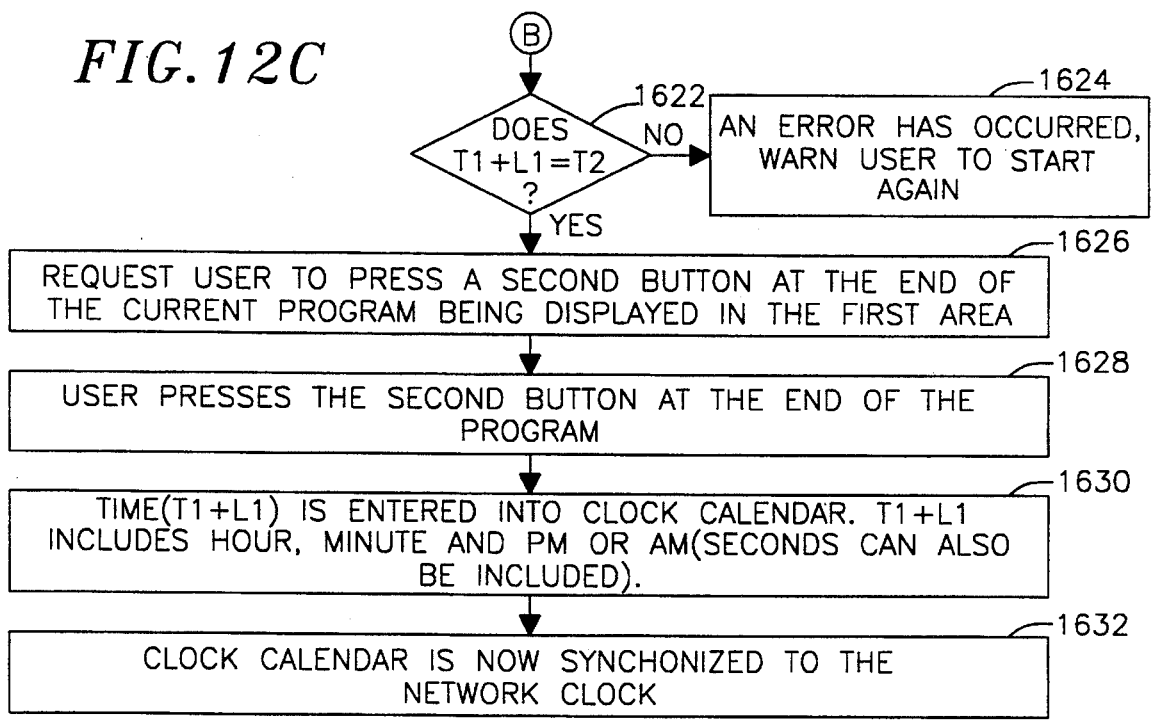

FIGS. 12A, 12B and 12C are flow diagrams of a method for synchronizing a clock to a network clock according the present invention. In step 1600 the user selects a clock setting mode. Then in step 1602, the currently tuned channel is displayed in a first area in the monitor as a picture in picture (PIP) reduced video. A program schedule for the currently tune channel is access from memory for the current date and displayed on a second area of the monitor. In this case, the monitor is assumed to be a television or an equivalent display device. Then in step 1604, a brief description for a program is displayed in a third area of the monitor. The brief description corresponds to the program being displayed in the first area of the monitor or corresponds to the program listing pointed to by a cursor in the program schedule displayed on the second area of the monitor. Then in step 1606, a display message requests the user to position a cursor on the program listing in the second area of the monitor that corresponds to the program being displayed in the first area. The user is then requested to press a first button to select the program listing that the user believes corresponds to the program displayed in the first area of the monitor. In step 1608, the user positions the cursor to a program listing and presses the first button. Then in step 1610, the program schedule is accessed and a first compressed code for the selected program listing is read from memory. A second compressed code for the next in time program listing for the same channel is also accessed from the memory. In step 1612, the first compressed code is decoded into channel (C1), day (D1), time of day (T1) and length of program (L1). The second compressed code is decoded into C2, D2, T2, and L2. The decoding can be performed according to the method of FIG. 6.

Then in step 1614, it is determined whether C1 is equal to the currently tuned to channel. This can be determined by microprocessor 1284, which controls the tuner 1272 and also receives the decoded compressed codes from compressed code decoder 1290. If C1 does not equal the currently tuned to channel, then in step 1616, the user is informed that the selected program listing is incorrect and step 1606 is repeated. If C1 does equal the currently tuned to channel then in step 1618, it is determined whether C1 equals C2. C1 should equal C2, because C2 has been decoded from a compressed code that is the next in time program listing for the same channel as C1. If C1 does not equal C2, then an error has occurred and the user is warned to start again in step 1620. Then in step 1622 it is determined whether T1 plus L1 equals T2. If not, an error has occurred and the user is warned to start again in step 1624.

If the criteria is satisfied, then in step 1626, the user is requested to press a second button at the end of the current program being displayed in the first area. In step 1628, the user presses the second button at the end of the program. Then in step 1630, the time T1 plus L1 is entered into the clock calendar. The time T1 plus L1 includes the hour and the minutes, including AM or PM. Seconds can also be included in the time. As indicated in step 1632, the clock calendar is now synchronized to the network clock. A disadvantage of the foregoing method is that although the time setting for the clock is automatically determined by decoding the compressed code, the user must press a button at the end of the program. Thus, the user must pay attention to the program to detect the end of the program and press the button at the correct time so that T1 plus L1 can entered into the clock calendar to synchronize the clock calendar to the network clock.

Figure 13A:
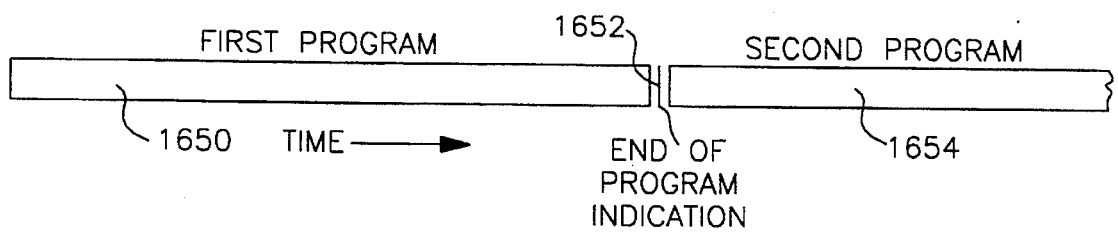
FIG. 13A is a timing diagram illustrating an end of program indication according to the present invention.
Figure 13B:
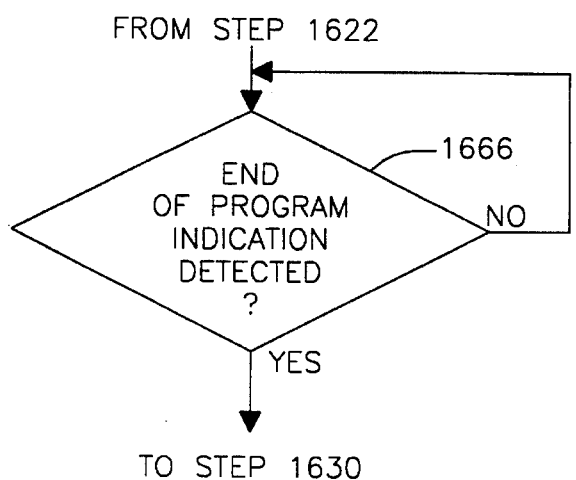
FIG. 13B is a flow diagram of a method for determining if an end of program indication has been detected according to the present invention.

Another embodiment of the present invention is to embed in a video signal for the program, an end of program indication 1652, as shown in FIG. 13A. As shown, the first program 1650, is followed by the second program 1654. At the end of the first program, and before the second program starts, the end of program indication 1652 is sent embedded in the video signal. A common way of embedding auxiliary information in a video signal is to embed the auxiliary information into the vertical blanking interval of the video signal. If an end of program indication 1652 is embedded in the video signal at the end of the first program, then it is not necessary for a user to press a button at the end of the first program. Steps 1626 and 1628 in FIG. 12C, can be replaced with step 1666 shown in FIG. 13B. In step 1666, it is determined whether an end of program indication has been detected.

Figure 14:
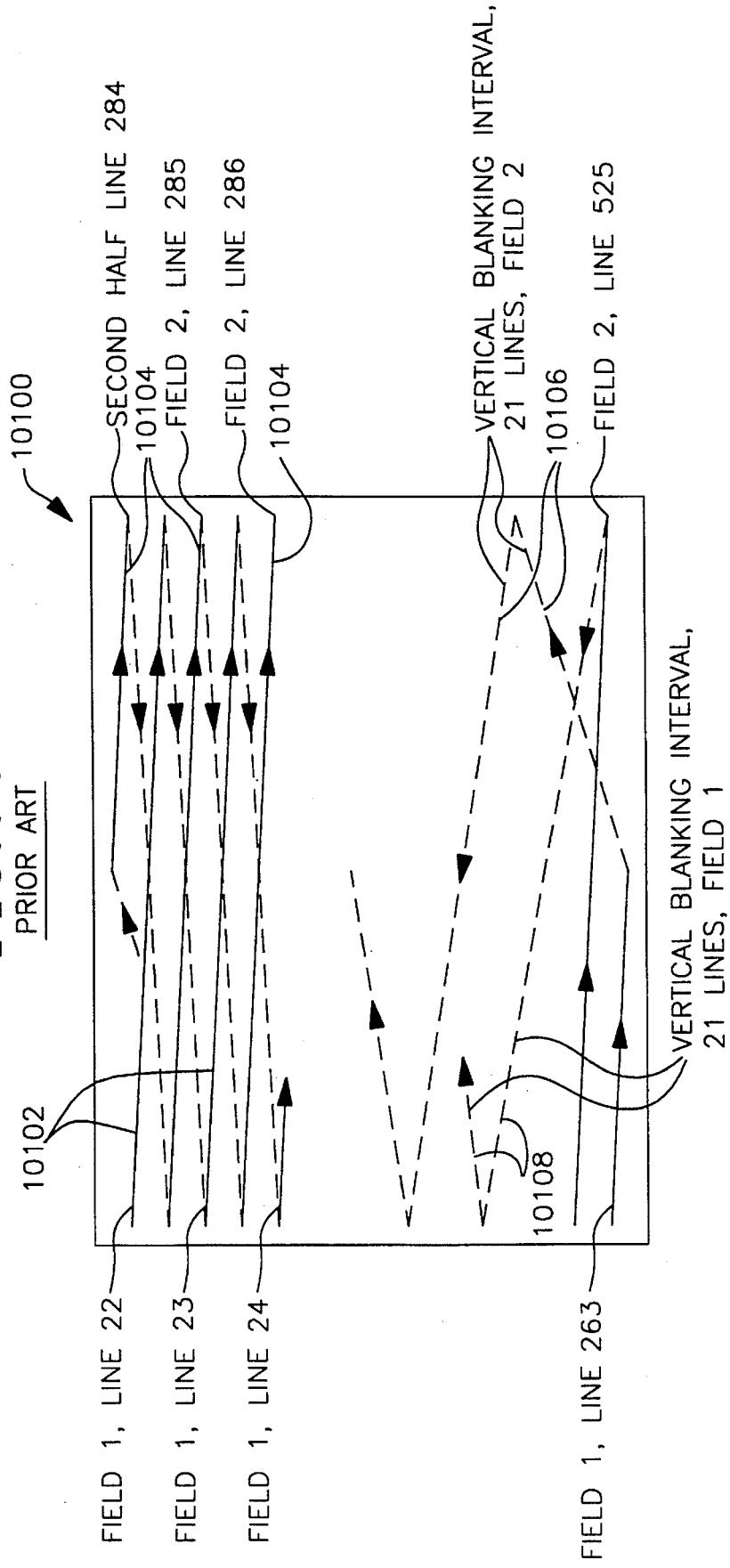
FIG. 14 is a schematic diagram illustrating an interlaced raster scanning pattern of a conventional television.

The following describes an apparatus and method for embedding end of program indication into a vertical blanking interval and the video signal. FIG. 14 is a schematic diagram illustrating the interlaced scanning pattern 10100 on a screen of a conventional television receiver. A video display scans the beam from the top left hand corner and scans across the screen (line 22, field 1 in FIG. 14). After it finishes scanning the first line, the beam returns to the left hand side during a period known as a horizontal blanking interval and repeats scanning along another line which is parallel to but lower than the previous line (line 23, field 1 in FIG. 14). The scanning continues along the lines until the beam reaches the center of the bottom part of the screen (line 263, field 1) to complete field 1, which is comprised of lines 10102.

From the bottom center of the screen, the beam returns to the top where it starts scanning from substantially the center of the screen along the lines 10104 for field 2 which interlace the lines of field 1. There is not an instantaneous bottom to top jump but actually requires scanning 21 horizontal lines. These lines 10106 are lines 1 through 21 of field 2. The second half of line 21 field two (line 284 as shown in FIG. 14) is displayed. Then lines 285 to 525 of field 2 are scanned to complete field 2. When the beam reaches the bottom, right hand corner of the screen, the picture frame is formed. Then the beam retraces to the top and the vertical blanking interval lines 10108 are numbered 1 through 21 of field 1. In the NTSC protocol widely used in North America, each field contains 262.5 horizontal lines and a pair of fields constitute a single 525 line video frame and creates one video picture at one instant in time on the video display.

During the time in which the beam returns from the bottom to the top of the screen between the fields, it carries no video or picture signals because it does not produce any picture element on the screen. This time interval is generally known as the vertical blanking interval (VBI). Apparatus and methods using the NTSC standard with 21 lines in each VBI are well known in the art and therefore are not discussed in detail herein. The VBI can be used for conveying auxiliary information from a television network or station to an audience. For example, closed caption data associated with the television program are transmitted as encoded composite data signals in VBI line 21, field 1 of the standard NTSC video signal, as shown in FIG. 16. Lines 1 through 9 of the VBI of each field are generally used for vertical synchronization and post equalizing pulses. Thus, lines 10 through 21 are available for auxiliary information.

Figure 15:
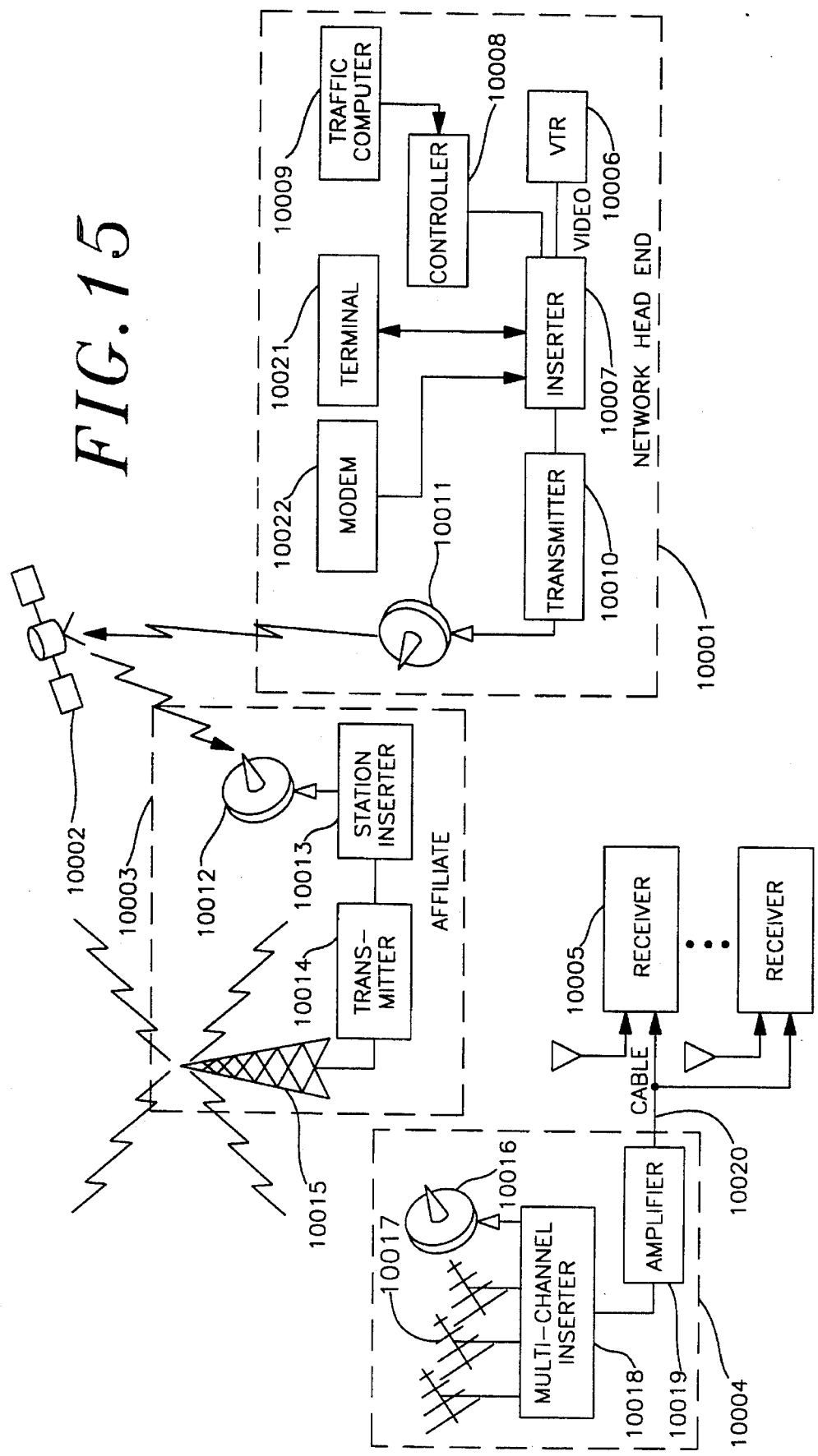
FIG. 15 is a functional block diagram of a television video and data transmission system.

FIG. 15 is a functional block diagram of a data transmission system. As used herein, the terms "broadcast" and "transmit" are used interchangeably for the transmission of signals over cable or fiber optics, to or from satellites, over the air, and the like. A network head end 10001 transmits a composite television signal containing inserted information in a portion thereof, typically the vertical blanking interval, to a satellite 10002 which rebroadcasts the same to a local affiliate 10003. The affiliate 10003 may further insert data into the vertical blanking interval of the received television signal and transmit the same to a local cable head end 10004. The cable head end 10004 receives television signals from a plurality of sources (including satellites) and may further insert data into the vertical blanking interval of any of the television signals. The signals from the plurality of sources are combined into a composite television signal, amplified, and provided over a cable to a plurality of individual receivers 10005, which can include televisions, cable boxes, VCRs and satellite receivers. In addition, the individual receivers 10005 may receive signals directly from the local affiliate 10003 by air, which may include the use of a satellite 10002, or by cable.

Each receiver 10005 includes a VBI decoder, which can include a VBI slicer and closed caption decoder, that scans VBI lines 10–21 of both fields 1 and 2. In addition it is possible to use the first few visible lines in each video frame for VBI data, for example, lines 22–24. Closed captioning and text mode data are generally transmitted on VBI line 21, field 1 of the standard NTSC video signal, at a rate of 2 bytes for each VBI line 21, field 1, as shown by closed caption data 10112 in FIG. 16. Extended data services (EDS) data can be transmitted on VBI line 21, field 2, as shown by EDS data 10116 in FIG. 16, at a rate of 2 bytes per VBI line 21, field 2. Caption data decoding is further described in the following specifications, which are hereby incorporated by reference herein: Title 47, Code of Federal Regulations, Part 15 as amended by GEN. Docket No. 91-1; FCC 91-119; "CLOSED CAPTION DECODER REQUIREMENTS FOR THE TELEVISION RECEIVERS"; Title 47, C.F.R., Part 73.682(a)(22), Caption Transmission format; Title 47, C.F.R. Part 73.699, FIG. 6; "TELEVISION SYNCHRONIZING WAVE FORM"; Title 47, C.F.R., Part 73.699, FIG. 17a; "LINE 21, FIELD 1 DATA SIGNAL FORMAT"; and PBS Engineering Report No. E-7709-C, "TELEVISION CAPTIONING FOR THE DEAF: SIGNAL AND DISPLAY SPECIFICATIONS". Extended data services (EDS) are further described in *Recommended Practice for Line 21 Data Service*, Electronics Industries Association, EIA-608 (drafts Oct. 12, 1992 and Jun. 17, 1993), the subject matter of which is incorporated herein by reference. The extended data includes, among other information, program name, program length, length into show, channel number, network affiliation, station call letters, UCT (universal coordinated time) time, time zone, and daylight savings time usage.

It is possible for the inserter to insert data other than closed captioning data and EDS data into the television signal. The inserted data 10114 can include an end of program indication, which is inserted into either or both fields in any VBI line between 10 and 21. The end of program indication can be inserted and sent at the end of a program, as shown in FIG. 13A. The end of program indication, which can be a special code, can be transmitted at 2 or 4 bytes/line.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. An apparatus for synchronizing a clock to a network clock comprising:

a calendar clock;

means for receiving a first compressed code representative of, and compressed in length from, the combination of a channel, a time-of-day, and a length of time for a first program on a first day and on a first channel currently tuned to and displayed on a television;

means for decoding the first compressed code into a first channel, a first time-of-day, and a first length of time;

means for receiving an end of program indication for the program on the first channel; and means for loading the sum of the first time-of-day and the first length of time into the clock calendar in response to receiving the end of program indication.

2. The apparatus of claim 1 further comprising:

means for receiving a second compressed code representative of, and compressed in length from, the combination of a channel, a time-of-day, and a length of time for a second program immediately following the first program on the first channel and on the same day as the first program;

means for decoding the second compressed code into a second channel, a second time-of-day, and a second length of time;

means for testing whether the decoded first channel equals the decoded second channel and whether a sum of the first time-of-day and the first length of time equals the second time-of-day; and means for requesting reentry of the first and second compressed codes, if the decoded first channel does not equal the decoded second channel or if a sum of the first time-of-day and the first length of time does not equal the second time-of-day.

3. The apparatus of claim 1 further comprising means for extracting a day from the first compressed code and entering the day into a clock calendar.

4. The apparatus of claim 3 wherein the means for extracting a day from the first compressed code and entering the day into the clock calendar comprises:

means for receiving a second compressed code representative of, and compressed in length from, the combination of a channel, a time-of-day, and a length of time for a second program immediately following the first program on the first channel and on the same day as the first program;

means for extracting a day from the second compressed code;

means for testing whether the extracted day from the first compressed code equals the extracted day from the second compressed code; and means for requesting reentry of the first and second compressed codes, if the extracted day from the first compressed code does not equal the extracted day from the second compressed code.

5. The apparatus of claim 2 further comprising:.

means for changing a month in the clock calendar and repeating a process of decoding the first and second compressed codes and testing whether the decoded first channel equals the decoded second channel and whether a sum of the first time-of-day and the first length of time equals the second time-of-day, if the decoded first channel does not equal the decoded second channel or the sum of the first time-of-day and the first length of time does not equal the second time-of-day; and means for changing a year in the clock calendar and repeating a process of decoding the first and second compressed codes and testing whether the decoded first channel equals the decoded second channel and whether a sum of the first time-of-day and the first length of time equals the second time-of-day, if the decoded first channel does not equal the decoded second channel or the sum of the first time-of-day and the first length of time does not equal the second time-of-day.

6. An apparatus for synchronizing a clock to a network clock comprising:

means for receiving a first compressed code representative of, and compressed in length from, the combination of a channel, a day, a time-of-day, and a length of time for a first program on a first channel currently tuned to and displayed on a television;

means for receiving a second compressed code representative of, and compressed in length from, the combination of a channel, a day, a time-of-day, and a length of time for a second program immediately following the first program on the first channel and on the same day as the first program;

means for extracting a day from the first compressed code and entering the day into a clock calendar;

means for decoding as a function of the clock calendar, the first compressed code into a first channel, a first day, a first time-of-day, and a first length of time;

means for decoding as a function of the clock calendar, the second compressed code into a second channel, a second day, a second time-of-day, and a second length of time;

means for testing whether the decoded first channel equals the decoded second channel and whether a sum of the first time-of-day and the first length of time equals the second time-of-day;

means for receiving an end of program indication for the program on the first channel; and means for loading the sum of the first time-of-day and the first length of time into the clock calendar in response to receiving the end of program indication, if the decoded first channel equals the decoded second channel and the sum of the first time-of-day and the first length of time equals the second time-of-day.

7. The apparatus of claim 6 wherein the means for extracting a day from the first compressed code and entering the day into a clock calendar comprises:

means for extracting a day from the second compressed code;

means for testing whether the extracted day from the first compressed code equals the extracted day from the second compressed code; and means for requesting reentry of the first and second compressed codes, if the extracted day from the first compressed code does not equal the extracted day from the second compressed code.

8. The apparatus of claim 6 further comprising:

means for changing a month in the clock calendar and repeating a process of decoding the first and second compressed codes and testing whether the decoded first channel equals the decoded second channel and whether a sum of the first time-of-day and the first length of time equals the second time-of-day, if the decoded first channel does not equal the decoded second channel or the sum of the first time-of-day and the first length of time does not equal the second time-of-day; and means for changing a year in the clock calendar and repeating a process of decoding the first and second compressed codes and testing whether the decoded first channel equals the decoded second channel and whether a sum of the first time-of-day-and the first length of time equals the second time-of-day, if the decoded first channel does not equal the decoded second channel or the sum of the first time-of-day and the first length of time does not equal the second time-of-day.

9. A method for synchronizing a clock to a network clock comprising the steps of:

receiving a first compressed code representative of, and compressed in length from, the combination of a channel, a time-of-day, and a length of time for a first program on a first day and on a first channel currently tuned to and displayed on a television;

decoding the first compressed code into a first channel, a first time-of-day, and a first length of time;

receiving an end of program indication for a program on the first channel; and loading the sum of the first time-of-day and the first length of time into the clock calendar in response to receiving the end of program indication for the program on the first channel.

10. The method of claim 9 further comprising the steps of:

receiving a second compressed code representative of, and compressed in length from, the combination of a channel, a time-of-day, and a length of time for a second program immediately following the first program on the first channel and on the same day as the first program;

decoding the second compressed code into a second channel, a second time-of-day, and a second length of time; and testing whether the decoded first channel equals the decoded second channel and whether a sum of the first time-of-day and the first length of time equals the second time-of-day; and requesting reentry of the first and second compressed codes, if the decoded first channel does not equal the decoded second channel or if a sum of the first time-of-day and the first length of time does not equal the second time-of-day.

11. The method of claim 9 further comprising the step of extracting a day from the first compressed code and entering the day into the clock calendar.

12. The method of claim 11 wherein the step of extracting a day from the first compressed code and entering the day into a clock calendar comprises the steps of:

receiving a second compressed code representative of, and compressed in length from, the combination of a channel, a time-of-day, and a length of time for a second program immediately following the first program on the first channel and on the same day as the first program;

extracting a day from the second compressed code;

testing whether the extracted day from the first compressed code equals the extracted day from the second compressed code; and requesting reentry of the first and second compressed codes, if the extracted day from the first compressed code does not equal the extracted day from the second compressed code.

13. The method of claim 10 further comprising the steps of:

changing a month in the clock calendar and repeating a process of decoding the first and second compressed codes and testing whether the decoded first channel equals the decoded second channel and whether a sum of the first time-of-day and the first length of time equals the second time-of-day, if the decoded first channel does not equal the decoded second channel or the sum of the first time-of-day and the first length of time does not equal the second time-of-day; and changing a year in the clock calendar and repeating a process of decoding the first and second compressed codes and testing whether the decoded first channel equals the decoded second channel and whether a sum of the first time-of-day and the first length of time equals the second time-of-day, if the decoded first channel does not equal the decoded second channel or the sum of the first time-of-day and the first length of time does not equal the second time-of-day.

14. A method for synchronizing a clock to a network clock comprising the steps of:

receiving a first compressed code representative of, and compressed in length from, the combination of a channel, a day, a time-of-day, and a length of time for a first program on a first channel currently tuned to and displayed on a television;

receiving a second compressed code representative of, and compressed in length from, the combination of a channel, a day, a time-of-day, and a length of time for a second program immediately following the first program on the first channel and on the same day as the first program;

extracting a day from the first compressed code and entering the day into a clock calendar;

decoding as a function of the clock calendar, the first compressed code into a first channel, a first day, a first time-of-day, and a first length of time;

decoding as a function of the clock calendar, the second compressed code into a second channel, a second day, a second time-of-day, and a second length of time;

testing whether the decoded first channel equals the decoded second channel and whether a sum of the first time-of-day and the first length of time equals the second time-of-day;

receiving an end of program indication for the program on the first channel; and loading the sum of the first time-of-day and the first length of time into the clock calendar in response to receiving the end of program indication for the program on the first channel, if the decoded first channel equals the decoded second channel and the sum of the first time-of-day and the first length of time equals the second time-of-day.

15. The method of claim 14 wherein the step of extracting a day from the first compressed code and entering the day into a clock calendar further comprises the steps of:

extracting a day from the second compressed code;

testing whether the extracted day from the first compressed code equals the extracted day from the second compressed code; and requesting reentry of the first and second compressed codes, if the extracted day from the first compressed code does not equal the extracted day from the second compressed code.

16. The method of claim 14 further comprising the steps of:

changing a month in the clock calendar and repeating a process of decoding the first and second compressed codes and testing whether the decoded first channel equals the decoded second channel and whether a sum of the first time-of-day and the first length of time equals the second time-of-day, if the decoded first channel does not equal the decoded second channel or the sum of the first time-of-day and the first length of time does not equal the second time-of-day; and changing a year in the clock calendar and repeating a process of decoding the first and second compressed codes and testing whether the decoded first channel equals the decoded second channel and whether a sum of the first time-of-day and the first length of time equals the second time-of-day, if the decoded first channel does not equal the decoded second channel or the sum of the first time-of-day and the first length of time does not equal the second time-of-day.

17. An apparatus for synchronizing a clock to a network clock comprising:

means for displaying a reduced video display of a program currently being received on a tuned to channel on a first portion of a television screen;

means for storing program schedules, the program schedules comprising for each program a compressed code for the program, the compressed code representative of, and compressed in length from, the combination of a channel, a time-of-day, and a length of time for the program;

a clock calendar for providing a current day and a time;

means for displaying on a second portion of the television screen a program schedule for the current day for the tuned to channel;

means for selecting a program entry in the program schedule corresponding to the program on the tuned to channel currently being received and displayed on the first portion of the television screen;

means for accessing from the stored program schedules, a first compressed code corresponding to the selected program entry;

means for decoding the first compressed code into a decoded first channel, a first time-of-day, and a first length of time;

means for receiving an end of program indication for the program on the tuned to channel; and means for loading the sum of the first time-of-day and the first length of time into the clock calendar in response to receiving the end of program indication.

18. The apparatus of claim 17 further comprising means for accessing from program schedule storage and displaying on a third portion of the television screen a program description corresponding to the program currently being received and displayed on the first portion of the television screen.

19. The apparatus of claim 17 further comprising means for accessing from program schedule storage and displaying on a third portion of the television screen a program description corresponding to a designated program listing displayed on a second portion of the television screen.

20. The apparatus of claim 17 further comprising:

means for testing whether the tuned to channel is the same as the decoded first channel; and means for informing a user that the current selected program entry is incorrect and requesting a user to select a program entry in the program schedule corresponding to the program on the tuned to channel currently being received and displayed on the first portion of the television screen.

21. The apparatus of claim 17 further comprising:

means for accessing from the stored program schedules, a second compressed code corresponding to the program listing for the tuned to channel immediately following the selected program entry;

means for decoding the second compressed code into a second channel, a second time-of-day, and a second length of time;

means for testing whether the decoded first channel equals the decoded second channel and whether a sum of the first time-of-day and the first length of time equals the second time-of-day; and means for warning that an error has occurred, if the decoded first channel does not equal the decoded second channel or if the sum of the first time-of-day and the first length of time does not equal the second time-of-day.

22. The apparatus of claim 17 wherein the means for selecting a program entry in the program schedule corresponding to the program on the tuned to channel currently being received and displayed on the first portion of the television screen comprises a cursor and a means for selecting the program entry at which the cursor is currently positioned.

23. The apparatus of claim 17 wherein the means for displaying a reduced video display of a program currently being received on a tuned to channel on a first portion of a television screen comprises a picture in picture device.

24. The apparatus of claim 17 wherein the means for storing program schedules comprises a vertical blanking interval decoder.

25. The apparatus of claim 17 wherein the means for receiving an end of program indication comprises a means for receiving a command from a remote controller having wireless communication to the means for receiving.

26. The apparatus of claim 17 wherein the means for receiving an end of program indication comprises a vertical blanking interval decoder for decoding an end of program indication embedded in a video signal on the tuned to channel and sent at the end of the program.

27. A method for synchronizing a clock to a network clock comprising the steps of:

displaying a reduced video display of a program currently being received on a tuned to channel on a first portion of a television screen;

accessing stored program schedules, the program schedules comprising for each program a compressed code for the program, the compressed code representative of, and compressed in length from, the combination of a channel, a time-of-day, and a length of time for the program;

displaying on a second portion of the television screen the accessed program schedule for the current day for the tuned to channel;

selecting a program entry in the program schedule corresponding to the program on the tuned to channel currently being received and displayed on the first portion of the television screen;

accessing from the stored program schedules, a first compressed code corresponding to the selected program entry;

decoding the first compressed code into a decoded first channel, a first time-of-day, and a first length of time;

receiving an end of program indication for the program on the tuned to channel; and loading the sum of the first time-of-day and the first length of time into the clock calendar in response to receiving the end of program indication.

28. The method of claim 27 further comprising the steps of accessing from program schedule storage and displaying on a third portion of the television screen a program description corresponding to the program currently being received and displayed on the first portion of the television screen.

29. The method of claim 27 further comprising the steps of accessing from program schedule storage and displaying on a third portion of the television screen a program description corresponding to a designated program listing displayed on a second portion of the television screen.

30. The method of claim 27 further comprising the steps of:

testing whether the tuned to channel equals the decoded first channel; and informing a user that the current selected program entry is incorrect and requesting a user to select a program entry in the program schedule corresponding to the program on the tuned to channel currently being received and displayed on the first portion of the television screen.

31. The method of claim 27 further comprising the steps of:

accessing from the stored program schedules, a second compressed code corresponding to the program listing for the tuned to channel immediately following the selected program entry;

decoding the second compressed code into a second channel, a second time-of-day, and a second length of time;

testing whether the decoded first channel equals the decoded second channel and whether a sum of the first time-of-day and the first length of time equals the second time-of-day; and warning that an error has occurred, if the decoded first channel does not equal the decoded second channel or if the sum of the first time-of-day and the first length of time does not equal the second time-of-day.

32. The method of claim 27 wherein the step of selecting a program entry in the program schedule corresponding to the program on the tuned to channel currently being received and displayed on the first portion of the television screen comprises the step of using a cursor for selecting the program entry at which the cursor is currently positioned.

33. The method of claim 27 wherein the step of displaying a reduced video display of a program currently being received on a tuned to channel on a first portion of a television screen comprises the step of using a video processor to display a picture within a picture.

34. The method of claim 27 wherein the step of receiving an end of program indication comprises the step of receiving a command from a remote controller having wireless communication to the means for receiving.

35. The method of claim 27 wherein the step of receiving an end of program indication comprises the step of decoding a vertical blanking interval to extract an end of program indication embedded in a video signal on the tuned to channel and sent at the end of the program.

* * * * *